(12) United States Patent
Ohta et al.

(10) Patent No.: US 10,051,669 B2
(45) Date of Patent: Aug. 14, 2018

(54) COMMUNICATION DURATION CONFIGURING METHOD, RELAY STATION, AND MOBILE COMMUNICATION SYSTEM

(75) Inventors: Yoshiaki Ohta, Yokohama (JP); Yoshihiro Kawasaki, Yokosuka (JP); Yoshiharu Tajima, Yokohama (JP); Yoshinori Tanaka, Yokohama (JP); Katsumasa Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 13/607,030

(22) Filed: Sep. 7, 2012

(65) Prior Publication Data

US 2013/0250773 A1 Sep. 26, 2013

Related U.S. Application Data

(63) Continuation of application No. PCT/JP2010/001774, filed on Mar. 12, 2010.

(51) Int. Cl.
*H04L 12/28* (2006.01)
*H04W 76/04* (2009.01)
(Continued)

(52) U.S. Cl.
CPC ............ *H04W 76/04* (2013.01); *H04B 7/155* (2013.01); *H04W 36/0088* (2013.01);
(Continued)

(58) Field of Classification Search
None
See application file for complete search history.

(56) References Cited

U.S. PATENT DOCUMENTS 9,113,466 B2 * 8/2015 Ohta ................. H04W 72/0446
9,118,381 B2 * 8/2015 Ode .................... H04B 7/15507
(Continued)

FOREIGN PATENT DOCUMENTS

CN       101175304 A     5/2008
WO    2008/107851 A2     9/2008
(Continued)

OTHER PUBLICATIONS

First Notification of Office Action issued for corresponding Chinese Patent Application No. 201080065273.4 dated Aug. 15, 2014 with a full translation of the Office Action.
(Continued)

*Primary Examiner* — Christopher T Wyllie
(74) *Attorney, Agent, or Firm* — Myers Wolin, LLC

(57) ABSTRACT

A communication duration configuring method is used in a mobile communication system including a mobile relay station for relaying a wireless communication between a base station and a mobile station. The method includes: configuring at least any of a downlink communication duration where the relay station receives a transmission signal from the base station by restricting a transmission of a signal from the relay station to the mobile station and an uplink communication duration where the relay station transmits a transmission signal to the base station by restricting a transmission of a signal from the mobile station to the relay station; and restricting a transmission of a signal with the mobile station in a first period from detection of a handover until when the communication duration is configured between the relay station and a target base station, and using a desired duration within the first period.

7 Claims, 21 Drawing Sheets

(51) Int. Cl.
H04B 7/155 (2006.01)
H04W 36/00 (2009.01)
H04W 76/20 (2018.01)
H04W 84/04 (2009.01)
H04W 88/04 (2009.01)
H04W 76/28 (2018.01)

(52) U.S. Cl.
CPC .......... *H04W 76/20* (2018.02); *H04W 76/28* (2018.02); *H04W 84/047* (2013.01); *H04W 88/04* (2013.01)

(56) References Cited

U.S. PATENT DOCUMENTS

| | | | |
|---|---|---|---|
| 9,198,086 B2* | 11/2015 | Obuchi | H04B 7/15507 |
| 9,326,287 B2* | 4/2016 | Ohta | H04W 72/0446 |
| 9,407,350 B2* | 8/2016 | Ohta | H04W 72/0446 |
| 9,516,515 B2* | 12/2016 | Ohta | H04B 7/15585 |
| 9,565,597 B2* | 2/2017 | Obuchi | H04B 7/15528 |
| 2004/0258011 A1* | 12/2004 | Hiyama et al. | 370/328 |
| 2006/0003696 A1* | 1/2006 | Diaz Cervera et al. | 455/11.1 |
| 2006/0159088 A1* | 7/2006 | Aghvami et al. | 370/389 |
| 2007/0104148 A1* | 5/2007 | Kang et al. | 370/331 |
| 2008/0031197 A1* | 2/2008 | Wang | H04B 7/15542 370/331 |
| 2008/0107091 A1* | 5/2008 | Ramachandran | 370/338 |
| 2008/0108350 A1* | 5/2008 | Hamasaki | H04W 36/08 455/436 |
| 2008/0165719 A1* | 7/2008 | Visotsky | H04B 7/2606 370/315 |
| 2008/0219275 A1* | 9/2008 | Boariu | H04W 8/005 370/401 |
| 2008/0285500 A1* | 11/2008 | Zhang et al. | 370/315 |
| 2009/0275326 A1* | 11/2009 | Lee | H04W 48/08 455/422.1 |
| 2009/0290554 A1* | 11/2009 | Siltala | H04W 36/0066 370/331 |
| 2009/0303919 A1* | 12/2009 | Kang et al. | 370/315 |
| 2009/0318090 A1* | 12/2009 | Flordelis | H04L 5/0007 455/67.13 |
| 2010/0034158 A1* | 2/2010 | Meylan | H04L 1/1854 370/329 |
| 2010/0061339 A1* | 3/2010 | Kim et al. | 370/331 |
| 2010/0197308 A1* | 8/2010 | Racz | H04W 36/0055 455/436 |
| 2010/0311419 A1* | 12/2010 | Bi | 455/435.1 |
| 2010/0322193 A1* | 12/2010 | Hu et al. | 370/331 |
| 2011/0080962 A1* | 4/2011 | Blankenship | H04B 7/2606 375/259 |
| 2011/0086639 A1* | 4/2011 | Kalervo Hamalainen et al. | 455/436 |
| 2011/0134887 A1* | 6/2011 | Jeon | H04W 36/0077 370/331 |
| 2011/0194407 A1* | 8/2011 | Ji et al. | 370/226 |
| 2011/0230187 A1* | 9/2011 | Jeon | H04B 7/2606 455/434 |
| 2012/0063417 A1* | 3/2012 | Redana et al. | 370/331 |
| 2012/0069735 A1* | 3/2012 | Tajima et al. | 370/225 |
| 2012/0243461 A1* | 9/2012 | Bucknell et al. | 370/315 |
| 2012/0282932 A1* | 11/2012 | Yu et al. | 455/437 |
| 2012/0315916 A1* | 12/2012 | Van Phan et al. | 455/442 |
| 2013/0044674 A1* | 2/2013 | Teyeb | H04B 7/15542 370/315 |
| 2013/0142107 A1* | 6/2013 | Ohta | H04W 72/0446 370/315 |
| 2013/0223328 A1* | 8/2013 | Obuchi | H04B 7/15528 370/315 |
| 2013/0225175 A1* | 8/2013 | Obuchi | H04B 7/15507 455/436 |
| 2013/0242771 A1* | 9/2013 | Ohta | H04B 7/15585 370/252 |
| 2015/0312909 A1* | 10/2015 | Ohta | H04W 72/0446 370/315 |
| 2016/0197667 A1* | 7/2016 | Ohta | H04W 72/0446 370/315 |

FOREIGN PATENT DOCUMENTS

WO WO 2008107851 A2 * 9/2008 ............ H04W 8/005
WO 2010/016676 A2 2/2010

OTHER PUBLICATIONS

InterDigital, "FDD Relay Type I Backhaul interference and HARQ issues", Agenda Item: 15.3, Jun. 29-Jul. 3, 2009, R1-092587, 3GPP TSG-RAN WG1 Meeting #57bis, Los Angeles, CA (US).

Office Action issued by the Canadian Intellectual Property Office for corresponding Canadian Patent Application No. 2,792,527, dated Mar. 16, 2015.

International preliminary report on patentability issued for International Patent Application No. PCT/JP2010/001774, dated Oct. 11, 2012.

3GPP TR 36.913 V8.0.1 (Mar. 2009); 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.

3GPP TR 36.912 V9.0.0 (Sep. 2009); 3rd Generation Partnership Project; Technical Specification Group Radio Access Network; "Feasibility study for Further Advancements for E-UTRA (LTE-Advanced) (Release 9)"; Sep. 2009.

3GPP TR 36.806 V2.0.0 (Feb. 2010); 3rd Generation Partnership Project; Technical Specification Group Radio Access Network; Evolved Universal Terrestrial Radio Access (E-UTRA); "Relay architectures for E-UTRA (LTE-Advanced) (Release 9)"; Feb. 2010.

3GPP TS 36.423 V9.0.0 (Sep. 2009); 3rd Generation Partnership Project; Technical Specification Group Radio Access Network; Evolved Universal Terrestrial Radio Access Network (E-UTRAN); "X2 application protocol (X2AP) (Release 9)"; Sep. 2009.

3GPP TS 36.413 V9.0.0 (Sep. 2009); 3rd Generation Partnership Project; Technical Specification Group Radio Access Network; Evolved Universal Terrestrial Radio Access Network (E-UTRAN); "S1 Application Protocol (S1AP) (Release 9)"; Sep. 2009.

NTT DOCOMO; "Type 1 Relay definition"; 3GPP TSG-RAN Meeting #60; R1-101281; San Francisco, USA; Feb. 22-26, 2010 <URL: http://www.3gpp.org/ftp/tsg_ran/WG1_RL1/TSGR1_60/Docs/R1-101281.zip>.

Alcatel-Lucent Shanghai Bell et al.; "Necessity of R-PHICH for Type I Backhaul Link Design"; Agenda Item: 7.8.1.3; 3GPP TSG RAN WG1 #59; R1-094630; Jeju, South Korea; Nov. 9-13, 2009 <URL: http://www.3gpp.org/ftp/tsg_ran/WG1_RL1/TSGR1_59/Docs/R1-094630.zip>.

Alcatel-Lucent; "Discussion on type 1 relay architecture"; Agenda Item: 7; 3GPP TSG RAN WG2 Meeting #66; R2-093087; San Francisco, USA; May 4-8, 2009 <URL: http://www.3gpp.org/ftp/tsg_ran/WG2_RL2/TSGR2_66/Docs/R2-093087.zip>.

3GPP TS 36.133 V8.8.0 (Dec. 2009); 3rd Generation Partnership Project; Technical Specification Group Radio Access Network; Evolved Universal Terrestrial Radio Access (E-UTRA); "Requirements for support of radio resource management (Release 8)"; Dec. 2009.

International Search Report issued for corresponding International Patent Application No. PCT/JP2010/001774 dated Jun. 1, 2010.

Extended European search report with European search opinion issued for corresponding European Patent Application No. 10847345.5 dated Oct. 8, 2014.

Teyeb et al., "Handover Framework for Relay Enhanced LTE Networks", pp. 1-5, Communications Workshops, 2009, ICC Workshops 2009, IEEE International Conference, IEEE, Piscataway, NJ (US), Jun. 14, 2009.

(56) References Cited

OTHER PUBLICATIONS

Teyeb et al., "Dynamic Relaying in 3GPP LTE-Advanced Networks", XP-002572643, vol. 2009, Article ID 731317, pp. 1-11, EURASHIP Journal on Wireless Communications and Networking, Hindawi Publishing Corporation, New York, NY (US), Jan. 1, 2009.

\* cited by examiner

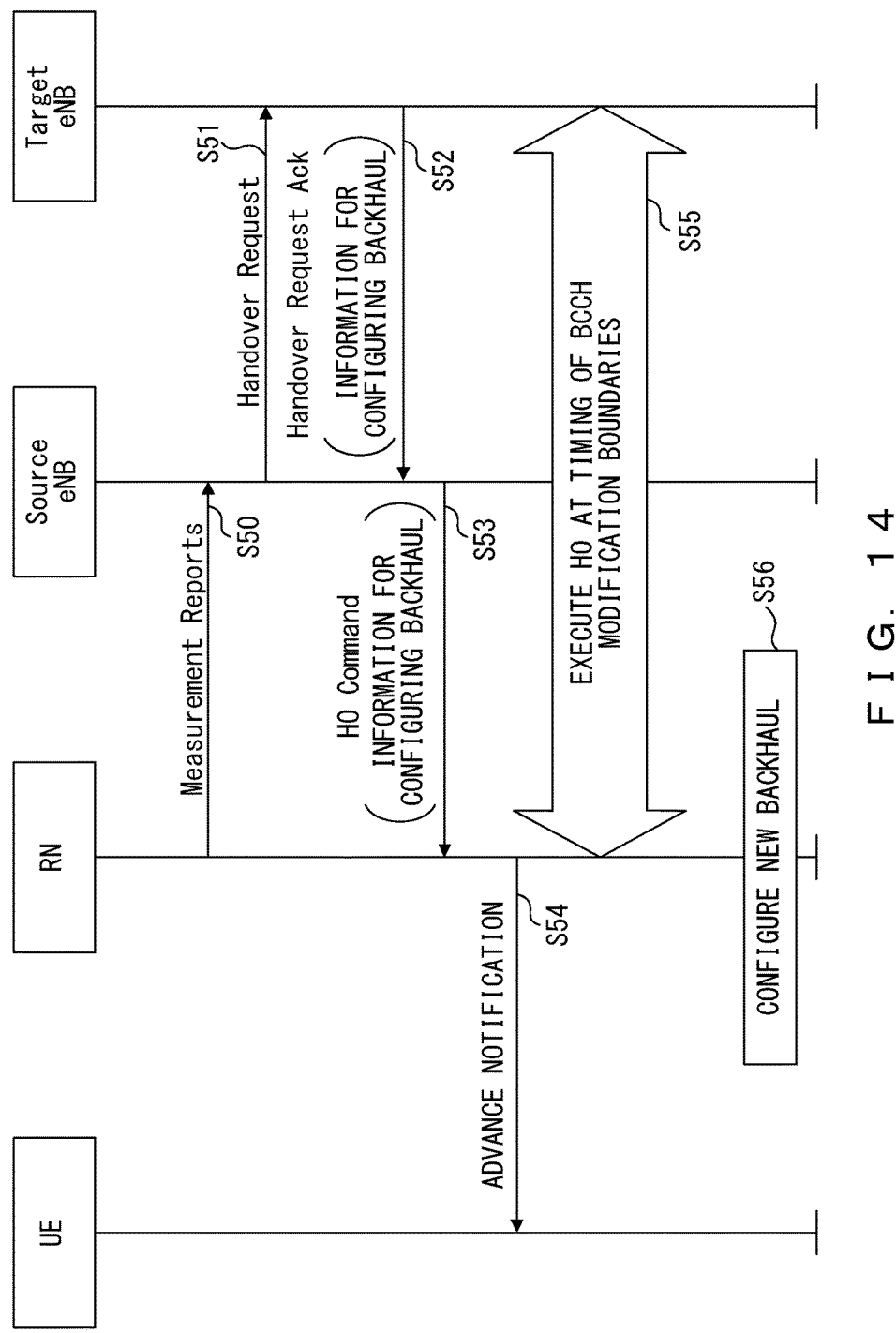
F I G. 14

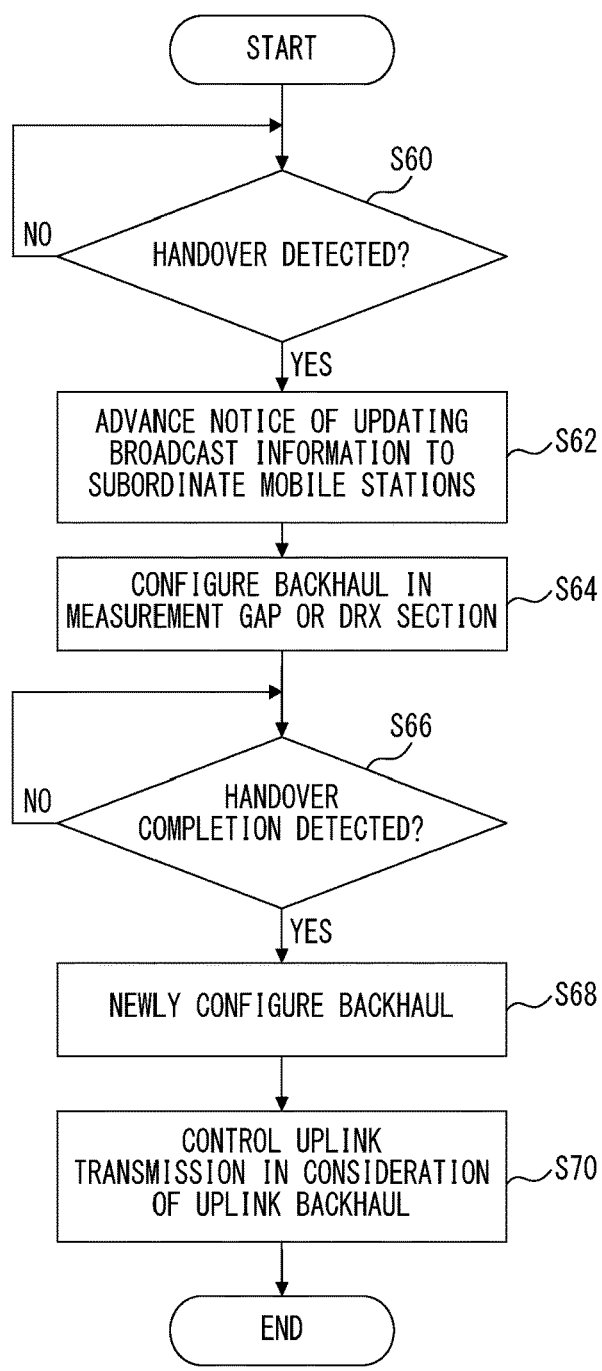
F I G. 15

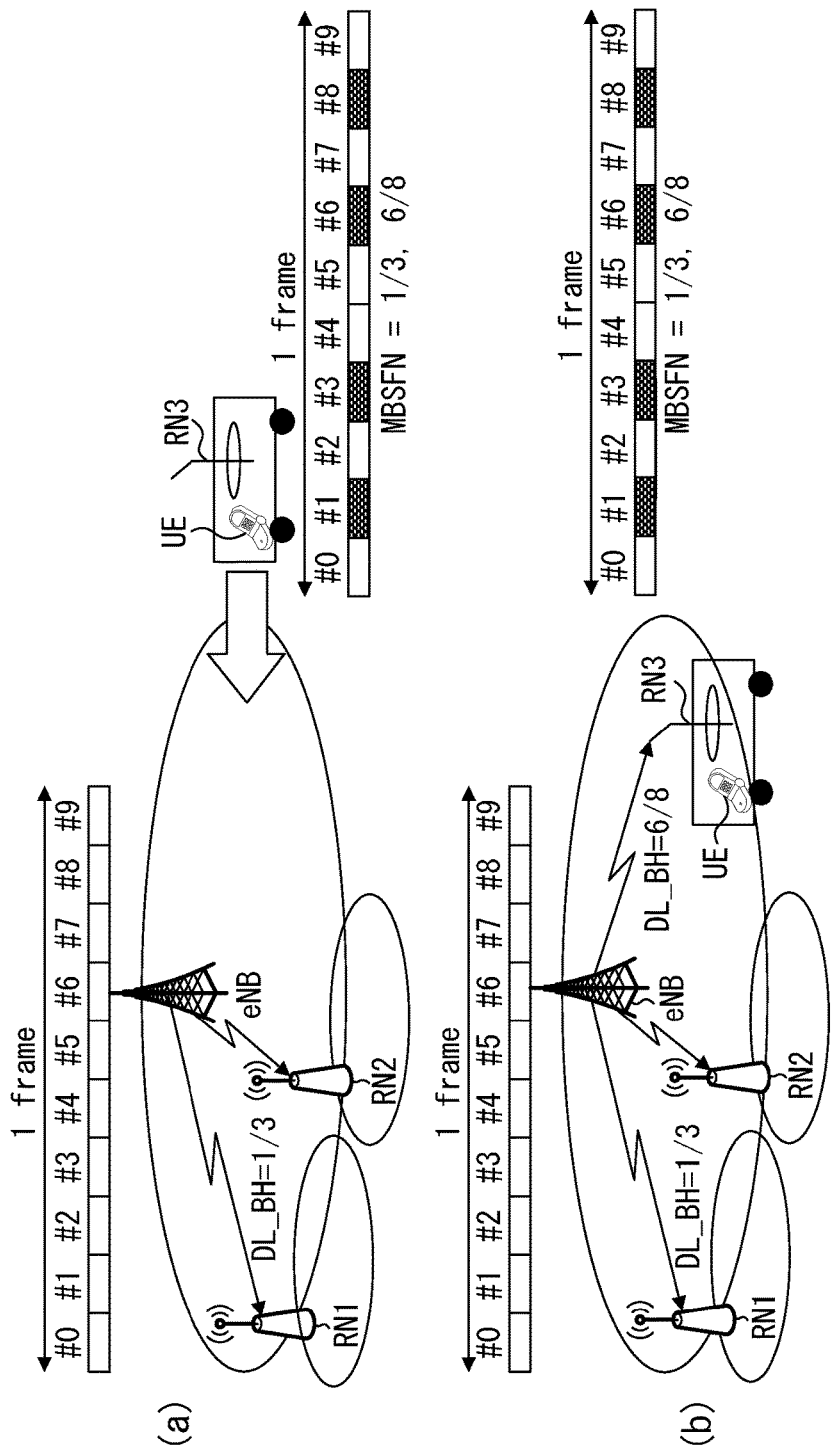
F I G. 18

COMMUNICATION DURATION CONFIGURING METHOD, RELAY STATION, AND MOBILE COMMUNICATION SYSTEM

CROSS-REFERENCE TO RELATED APPLICATION

This application is a continuation application of International Application PCT/JP2010/001774 filed on Mar. 12, 2010 and designated the U.S., the entire contents of which are incorporated herein by reference.

FIELD

The embodiments described herein are related to a relay technique of a wireless communication between a base station and a mobile station.

BACKGROUND

Efforts are being made to evolve cellular mobile communication systems from UMTS (Universal Mobile Telecommunication System) into LTE (Long Term Evolution). With LTE, OFDM (Orthogonal Frequency Division Multiplexing) and SC-FDMA (Single Carrier-Frequency Division Multiple Access) are respectively employed as downlink and uplink wireless access techniques, and a high-speed wireless packet communication at a downlink peak transmission rate of 100 Mb/s or faster, and at an uplink peak transmission rate of 50 Mb/s or faster, is enabled. 3GPP (3rd Generation Partnership Project), an international standardization organization, has launched a study of an LTE-based mobile communication system LTE-A (LTE-Advanced) to realize a higher-speed communication. With LTE-A, a downlink peak transmission rate of 1 Gb/s and an uplink peak transmission rate of 500 Mb/s are pursued as a goal, and diverse new techniques for wireless access schemes, network architectures, and the like are currently being studied (Documents 1-6). In the meantime, since LTE-A is a scheme based on LTE, efforts are being made to maintain backward compatibility.

As one method of performing a high-speed data communication, a method of introducing relay stations (RNs: Relay Nodes) is currently being studied, as illustrated in FIG. 1, in order to support a communication between a base station and a mobile station (Document 2). The relay station is installed to support high-speed data communication by relaying between a base station (Doner eNB or eNB) and a mobile station (UE: User Equipment). As illustrated in FIG. 2, a link between the mobile station UE and the relay station RN, and a link between the base station (eNB) and the relay station (RN) are referred to as Uu and Un, respectively. In the following description, Uu and Un are sometimes referred to as an access link and a backhaul, respectively.

Various types of schemes are considered as forms of the relay station. A repeater scheme, a decode-and-forward scheme, and L2 and L3 schemes are the main ones being studied. Here, a relay station of the repeater scheme only has a function of amplifying a wireless signal (data signal and noise). A relay station of the decode-and-forward scheme has a function of amplifying only a data signal within a wireless signal. A relay station of the L2 scheme has an L2 function such as a MAC layer. A relay station of the L3 scheme has an L3 function, such as an RRC layer or the like, and operates similarly to a base station. The relay station of the L3 scheme is called "Type1 RN" in LTE-A.

A method of deploying a relay station in a cell is also under review. For example, a deployment method of installing a relay station at an edge of a cell in order to increase a throughput at the edge of the cell, and a deployment method of installing a relay station in a range (dead spot) locally unreachable by radio waves from a base station within a cell are mainly being studied.

For a relay (inband relaying) that shares the same frequency band between a base station and a relay station and between the relay station and a mobile station when data is transmitted/received between the base station and the mobile station via the relay station of the L3 scheme (Type1 RN), it is preferable not to cause self-interference in the relay station. Self-interference (also called loop interference) is interference such that, for example, when a relay station transmits downlink data from the relay station to a mobile station at the same time that the relay station receives downlink data addressed to the relay station from a base station, the transmitted data gets into a receiver module of the relay station and interferes with the data received from the base station. Self-interference may similarly occur in the case of uplink data. When self-interference occurs, a relay station cannot properly receive data.

To overcome this self-interference problem, a study of LTE-A is currently underway based on the following policies (Document 2).

(A) Downlink: A relay station does not transmit data to a mobile station in a downlink backhaul (DL backhaul) that is a subframe with which data is received from an upper-level base station.

(B) Uplink: A relay station does not receive data from a mobile station in an uplink backhaul (UL backhaul) that is a subframe with which data is transmitted to an upper-level base station.

Based on the above described policy (A), when a downlink backhaul is configured between a relay station and a base station, a subframe between the relay station and a mobile station is configured as an MBSFN (Multicast/Broadcast over Single Frequency Network) subframe as illustrated in FIG. 3. The reason is as follows. A mobile station conforming to LTE does not receive unicast data with an MBSFN subframe. Accordingly, the mobile station UE does not receive some of reference signals, and does not need to unnecessarily measure the reference signals, which is advantageous. More specifically, in a downlink backhaul, the relay station can transmit a PDCCH (Physical Downlink Control Channel), a PHICH (Physical Hybrid ARQ Indicator Channel), and a PCFICH (Physical Control Format Indicator Channel) as control signals to the mobile station, but cannot transmit a PDSCH. The reference signal is arranged in the first half (CTRL section in FIG. 3) of the MBSFN subframe in order to receive the control signal. However, the reference signal is not arranged in the latter half of the MBSFN subframe.

Based on the above described policy (B), the relay station performs a control so as not to give an uplink data transmission grant (UL grant) to the mobile station 4 subframes (4 ms) before an uplink backhaul. This control is performed to avoid a situation where the mobile station transmits data to the relay station in the uplink backhaul if the relay station gives the uplink data transmission grant to the mobile station 4 ms before the uplink backhaul.

The relay station also performs a control so as not to make a downlink data transmission to the mobile station 4 subframes (4 ms) before the uplink backhaul. This control is performed to avoid the following situation. A HARQ (Hybrid Automatic Repeat reQuest) of LTE is specified such that a destination station returns an ACK/NACK signal 4 ms (time period corresponding to 4 subframes) after a data transmission made by a source station. Accordingly, if the relay station transmits downlink data to the mobile station during 4 ms of the uplink backhaul, the mobile station returns the ACK/NACK signal to the relay station in the uplink backhaul.

Note that, in the uplink backhaul, a PUCCH (Physical Uplink Control Channel) and a PUSCH (Physical Uplink Shared Channel) that are control signals to the relay station can be transmitted, but a PUCCH and a PUSCH that are control signals from the mobile station cannot be transmitted.

There are some documents which relate to the present application.

Document 1: 3GPP TR 36.913 V8.0.1 (2009-03), 3rd Generation Partnership Project; Technical Specification Group Radio Access Network; Requirements for further advancements for Evolved Universal Terrestrial Radio Access (E-UTRA) (LTE-Advanced) (Release 8)

Document 2: 3GPP TR 36.912 V9.0.0 (2009-09), 3rd Generation Partnership Project; Technical Specification Group Radio Access Network; Feasibility study for Further Advancements for E-UTRA (LTE-Advanced) (Release 9)

Document 3: 3GPP TS 36.133 V8.8.0 (2009-12), 3rd Generation Partnership Project; Technical Specification Group Radio Access Network; Evolved Universal Terrestrial Radio Access (E-UTRA); Requirements for support of radio resource management (Release 9) Document 4: 3GPP TR 36.806 V2.0.0 (2010-02), 3rd Generation Partnership Project; Technical Specification Group Radio Access Network; Evolved Universal Terrestrial Radio Access (E-UTRA); Relay architectures for E-UTRA (LTE-Advanced) (Release 9)

Document 4: 3GPP TR 36.806 V2.0.0 (2010-02), 3rd Generation Partnership Project; Technical Specification Group Radio Access Network; Evolved Universal Terrestrial Radio Access (E-UTRA); Relay architectures for E-UTRA (LTE-Advanced) (Release 9)

Document 5: GPP TR 36.423 V9.0.0 (2009-09), 3rd Generation Partnership Project; Technical Specification Group Radio Access Network; Evolved Universal Terrestrial Radio Access Network (E-UTRAN); X2 Application protocol (X2AP) (Release 9)

Document 6: 3GPP TR 36.413 V9.0.0 (2009-09), 3rd Generation Partnership Project; Technical Specification Group Radio Access Network; Evolved Universal Terrestrial Radio Access Network (E-UTRAN); S1 Application protocol (S1AP) (Release 9)

In a case where a relay station is fixedly arranged, a backhaul configured between the relay station and a base station that covers a cell where the relay station is arranged is considered to be almost fixed and not to vary with time. However, a backhaul of a moving relay station (hereinafter referred to as a mobile relay station as needed) can be changed with a handover of the relay station (see FIG. 4) according to a connected base station. Accordingly, when a handover occurs, the mobile relay station notifies a mobile station under the mobile relay station of a new MBSFN subframe as a downlink backhaul used after the handover. The new MBSFN subframe is implemented by updating broadcast information (a BCCH (Broadcast Control Channel)).

However, time is needed to update the broadcast information. This point is described with reference to FIG. 5. FIG. 5 is an explanatory view of a relationship between an update of broadcast information and an update of a backhaul.

To update the broadcast information, the mobile relay station initially makes an advance notification of updating the broadcast information to the mobile station by transmitting a Paging message or broadcast information including a Value Tag. Here, the broadcast information is updated by using a duration "BCCH modification period" as a reference. Namely, the contents of the broadcast information are reflected in the next BCCH modification period after the advance notification is given. With reference to FIG. 5(a), if the current BCCH modification period is assumed to be a BCCH modification period (n), and if the advance notification is given within a duration of this BCCH modification period (n), the broadcast information is applied in the next duration BCCH modification period (n+1). A boundary between adjacent BCCH modification periods is referred to as "BCCH modification boundaries". Namely, after the advance notification is given, new broadcast information is applied when the next BCCH modification boundary is passed. According to LTE, if a length of the duration of the BCCH modification period is assumed to be m, m={640 ms, 1280 ms, 2560 ms, . . . , 40960 ms} is specified, and BCCH modification boundaries=SFN mod m (SFN is a frame number (System Frame Number) are specified.

As described above, there is a time lag between the time when an advance notification is given and the time when new broadcast information is applied based on the advance notification. Therefore, a new backhaul based on the broadcast information cannot be configured between these times. With reference to FIG. 5(b), a handover (HO) of the mobile relay station is detected at a certain timing during the BCCH modification period (n), and an advance notification is given to a mobile station under the mobile relay station. New broadcast information based on the advance notification is applied in and after the BCCH modification period (n+1). Accordingly, a backhaul cannot be configured between the mobile relay station and a target base station of the handover during the first period from the time when the handover is detected and the advance notification is given up to the start time (namely, the next BCCH modification boundaries) of the BCCH modification period (n+1).

In the meantime, measures to continuously configure a backhaul used before the handover are considered to be taken during the first period. However, there is a situation in which it is difficult to take these measures. This point is described with reference to FIG. 6 and FIG. 7. FIG. 6 and FIG. 7 are explanatory views of the situation in which it is difficult to continuously configure the backhaul used before the handover after the handover is performed. In these figures, (a) schematically illustrates a state before the handover is complete, and (b) schematically illustrates a state after the handover is complete.

The example illustrated in FIG. 6(a) represents a case where a subframe #1 (MBSFN=1) from among 10 subframes #0 to #9 within one frame is configured as an MBSFN subframe of a mobile relay station RN3 before the handover occurs. At this time, assume a situation where the subframe #1 is used as an MBSFN subframe (MBSFN=1) for a mobile station and a downlink backhaul is configured in a subframe #3 (DL_BH=3) for a relay station RN1 in a target base station eNB of the handover. In such a situation, the mobile relay station cannot configure the subframe #1 as a downlink backhaul after the handover is performed.

The reason is as follows. The subframe #1 that is used as the MBSFN subframe for the mobile station under the target base station eNB is transmitted to the mobile station in the signal format dedicated to MBSFN as illustrated in FIG. 3. In contrast, even if the downlink backhaul of the mobile relay station RN3 after the handover is attempted to be configured in the subframe #1, a signal is transmitted in the signal format dedicated to unicast data in the backhaul. Therefore, both of these signals are inconsistent with each other in the subframe #1.

Accordingly, in the example illustrated in FIG. 6(a), it is preferable that the mobile relay station RN3 changes the downlink backhaul to a subframe other than the subframe #1; for example, the subframe #3 (FIG. 6(b)).

The example illustrated in FIG. 7(a) represents the case where the subframes #1 and #3 (MBSFN=1/3) among the 10 subframes #0 to #9 within one frame are configured as the MBSFN subframes of the mobile relay station RN3. At this time, assume a situation where a downlink backhaul is respectively configured in the subframes #1 and #3 (DL_BH=1/3) for relay stations RN1 and RN2 in the target base station eNB of the handover. In such a situation, the downlink backhaul configured before and after the handover is the same. In this case, it may be difficult to configure the same backhaul as that of the relay stations RN1 and RN2 in the mobile relay station RN3 from the viewpoint of a traffic load and QoS. In such a case, it is preferable that the mobile relay station RN3 changes the downlink backhaul to subframes other than the subframes #1 and #3; for example, the subframes #6 and #8 (FIG. 7(b)).

SUMMARY

According to an aspect of the embodiments, a communication duration configuring method is used in a mobile communication system including a mobile relay station for relaying a wireless communication between a base station and a mobile station. The method includes: configuring at least any of a downlink communication duration where the relay station receives a transmission signal from the base station by restricting a transmission of a signal from the relay station to the mobile station and an uplink communication duration where the relay station transmits a transmission signal to the base station by restricting a transmission of a signal from the mobile station to the relay station; and restricting or halting a transmission/reception of a signal to/from the mobile station in a first period from detection of a handover by the relay station until when the communication duration is configured between the relay station and a target base station, and using a desired duration within the first period as the communication duration.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a flowchart illustrating a processing method of a handover of a mobile relay station in a mobile communication system according to a third embodiment;

FIG. 15 is a flowchart illustrating an example of operations of the mobile relay station according to the third embodiment;

FIG. 18 schematically illustrates the backhaul configuring method according to the fourth embodiment;

DESCRIPTION OF EMBODIMENTS

A plurality of embodiments are described below. In the following description, a base station, a relay station, and a mobile station are respectively abbreviated to eNB, RN and UE as needed. The base station eNB according to the embodiments is a donor base station (Donor eNB or DeNB) that supports a backhaul between a relay station RN and the base station.

In the following description, "backhaul duration or durations" indicates one or a plurality of durations among a plurality of durations configured in units of TTIs (Transmission Time Intervals) in a single radio frame. In this embodiment, TTI is assumed to be a time in units of subframes (1 ms). "configuring a backhaul" may indicate configuring or identifying a backhaul as a subframe within a radio frame. Also if TTI is not a time in units of subframes, the embodiments are applicable. Namely, TTI originally meant a "time needed to transmit a Transport Block", and a subframe originally meant a "duration where a wireless resource is configured". Accordingly, there are cases where TTI is not always a time in units of subframes (such as a case where two Transport Blocks are transmitted in one subframe). However, the embodiments are applicable to this case also.

(1) First Embodiment (1-1) Backhaul Configuring Method According to this Embodiment In a mobile communication system according to this embodiment, a common communication restriction period is configured for all mobile stations in a first period from a time when a handover of a mobile relay station RN is detected and an advance notification is made up to a start time (BCCH modification boundaries) of the next BCCH modification period. In this embodiment, a Measurement gap specified by LTE is applied as the above described communication restriction period.

The Measurement Gap is a duration that is provided to perform handover of a mobile station UE and has a downlink of 6 ms and an uplink of 7 ms as described in the above Document 3. For example, 40 ms is specified as an interval of the Measurement gap. In this Measurement gap, the mobile station UE switches a reception frequency to measure a wireless quality of a frequency band that is different from that of a base station eNB with which the mobile station is currently communicating. Namely, since an uplink transmission is not made from the mobile station UE to the mobile relay station RN in the Measurement gap, an uplink backhaul can be configured within the Measurement gap.

Figure 8:
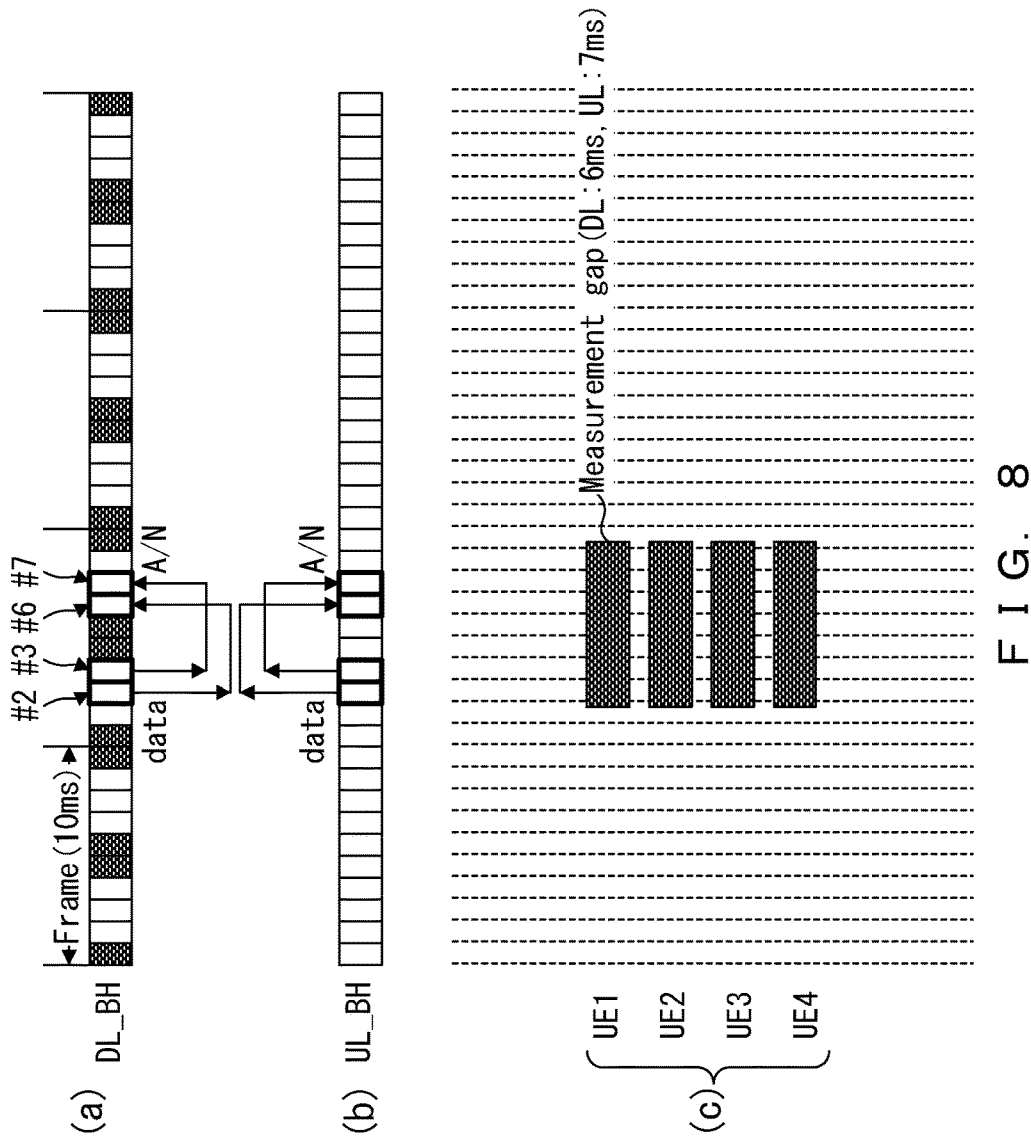
FIG. 8 is an explanatory view of a backhaul configuring method according to a first embodiment.

The first embodiment is further described with reference to FIG. 8. FIG. 8 is an explanatory view of a backhaul configuring method according to this embodiment. In FIG. 8, (a) represents durations of subframes configurable as a downlink backhaul, (b) represents durations of subframes configurable as an uplink backhaul, and (c) represents a duration of a Measurement gap configured for all mobile stations UE.

(a) of FIG. 8 represents the durations of the subframes configurable as a downlink backhaul in consideration of the communication specification of LTE. Namely, LTE stipulates that subframes #0, #4, #5 and #9 addressed to a mobile station UE are respectively used for Primary SCH, Paging, Secondary SCH, and Paging in a downlink communication. Therefore, a downlink backhaul cannot be configured in these subframes. Accordingly, any of the remaining subframes #1, #2, #3, #6, #7 and #8 is a configuration candidate of the downlink backhaul. (a) of FIG. 8 represents an example where the downlink backhaul is configured in the subframes #2, #3, #6 and #7. Moreover, the uplink backhaul is configured in the same way as the downlink backhaul (FIG. 8(b)). At this time, an ACK/NACK signal (A/N) as an acknowledgment reply to a data transmission (data) made from the base station eNB to the mobile relay station RN in the subframes #2 and #3 is returned after the 4 ms specified by LTE, namely, in the subframes #6 and #7 that are the uplink backhaul. Similarly, A/N in reply to a data transmission made from the mobile relay station RN to the base station eNB in the subframes #2 and #3 is returned after 4 ms, namely, in the subframes #6 and #7 that are the downlink backhaul.

At this time, in the mobile communication system according to this embodiment, a common Measurement gap is configured for all mobile stations UE (here UEs 1-4) as illustrated in FIG. 8(c). The mobile relay station RN according to this embodiment configures a backhaul within the Measurement gap during the first period (the duration up to the start time of the next BCCH modification period) at the time of detecting a handover and making an advance notification. At this time, a communication of an access link is not made even if a backhaul is configured in any subframe within one frame as long as it is within the Measurement gap. Therefore, self-interference of the mobile relay station RN cannot occur in the first period.

FIG. 8(c) illustrates an example where the downlink and the uplink backhauls are configured in the subframes #2, #3, #6 and #7. However, this is merely one example. The backhauls may be configured in a duration of any subframe within one frame as long as a common duration of the Measurement gap is configured for all mobile stations UE and the backhauls are configured within this duration.

(1-2) Configurations of the Base Station eNB and the Mobile Relay Station RN

Examples of configurations of the base station eNB and the mobile relay station RN according to this embodiment are described next.

Figure 9:
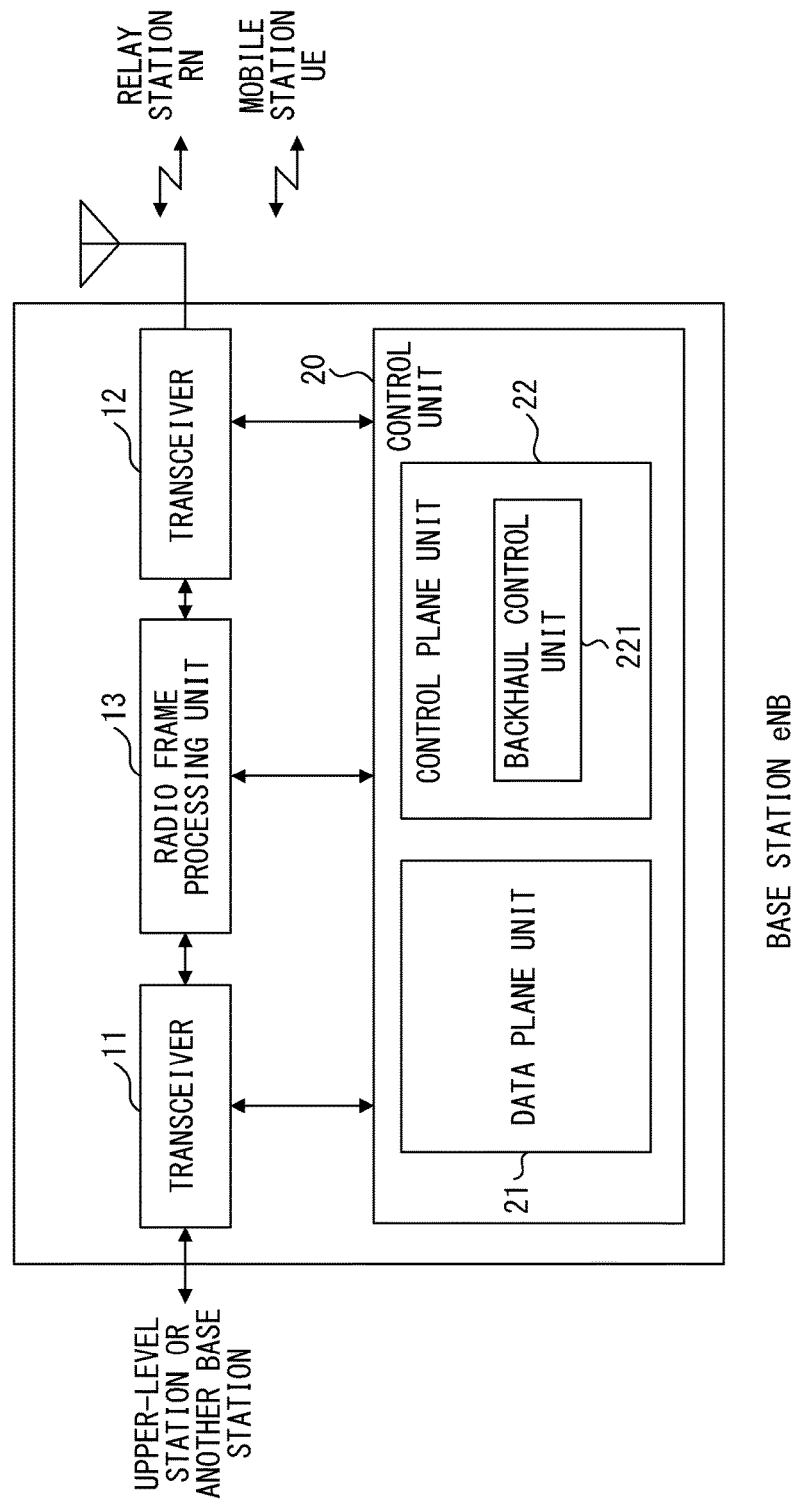
FIG. 9 is a block diagram illustrating a configuration example of a base station according to the first embodiment.
Figure 10:
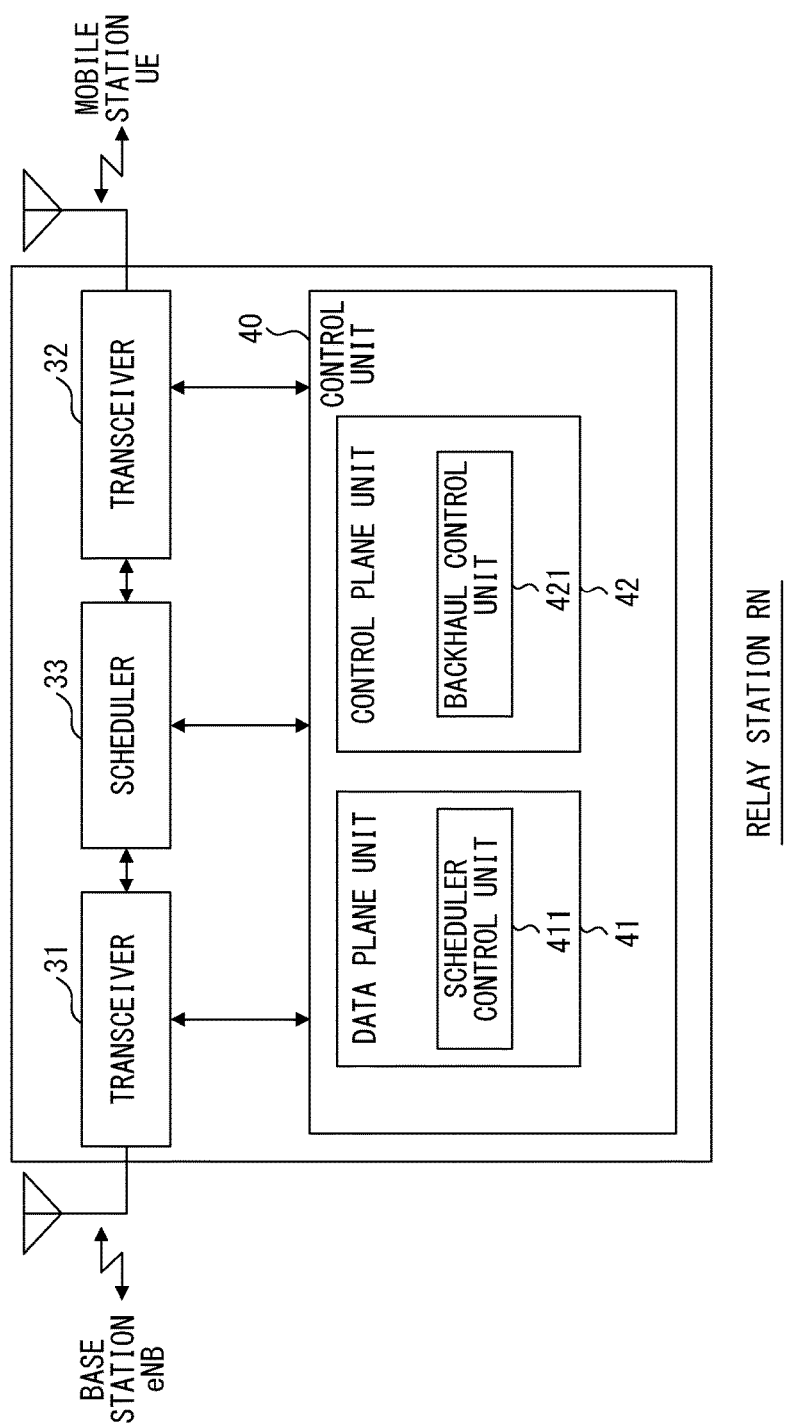
FIG. 10 is a block diagram illustrating a configuration example of a relay station according to the first embodiment.

The configurations of the base station eNB and the mobile relay station RN are initially described with reference to FIGS. 9 and 10. FIGS. 9 and 10 are block diagrams respectively illustrating the configurations of the base station eNB and the mobile relay station RN.

As illustrated in FIG. 9, the base station eNB according to this embodiment includes transceivers 11, 12, a radio frame processing unit 13, and a control unit 20. The control unit 20 includes a data plane unit 21, and a control plane unit 22 having a backhaul control unit 221.

The transceiver 11 performs a transmission/reception process according to X2 protocol to/from another base station, and a transmission/reception process according to S1 protocol to/from an upper-level station such as an MME (Mobility Management Entity) or the like. The transceiver 12 performs a transmission/reception process with a mobile relay station RN and a mobile station UE. For example, when a downlink radio frame is transmitted in OFDM, the transceiver 12 performs processes such as a conversion (IFFT process) from a radio frame generated by the radio frame processing unit 13 into a time domain signal for each sub-carrier, a combining process of time domain signals, a CP (Cyclic Prefix) addition process, and the like.

The data plane unit 21 of the control unit 20 mainly performs a protocol process of a signal of a data plane with the mobile relay station RN and the mobile station UE, and performs scheduling (radio resource allocation process) in units of resource blocks for each mobile relay station RN and mobile station UE.

The control plane unit 22 of the control unit 20 mainly performs a protocol process of a signal of a control plane of the upper-level station or another base station, the mobile relay station RN, and the mobile station UE.

The backhaul control unit 221 performs a control to configure a backhaul between the mobile relay station RN and the base station. For example, the backhaul control unit 221 may configure a backhaul, and may release the backhaul based on a message from the mobile relay station RN.

For the scheduling performed by the data plane unit 21, a backhaul configured by the backhaul control unit 221 is taken into consideration. The radio frame processing unit 13 generates a radio frame addressed to the mobile relay station RN and the mobile station UE according to results of the scheduling performed by the data plane unit 21.

As illustrated in FIG. 10, the mobile relay station RN according to this embodiment relays a wireless communication between the base station eNB and the mobile station UE. This mobile relay station RN includes transceivers 31, 32, a scheduler 33, and a control unit 40. The control unit 40 includes a data plane unit 41 having a scheduler control unit 411, and a control plane unit 42 having a backhaul control unit 421.

The transceiver 31 (first transceiver) performs a transmission/reception process to/from the base station eNB. The transceiver 32 (second transceiver) performs a transmission/reception process to/from the mobile station UE. In the mobile relay station RN, a received signal is demodulated and decoded when a wireless communication between the base station eNB and the mobile station UE is relayed. Then, scheduling is performed for a data signal within the demodulated and decoded received signal, which is again encoded and modulated, and transmitted. For example, when a downlink signal is an OFDM signal, the transceiver 31 separates data signals for sub-carriers by executing an FFT process on the OFDM signal received from the base station eNB, and executes demodulation and decoding processes for this data signals. Encoding and modulation processes are again executed for the data signals, which are then mapped onto a specified radio frame format by the scheduler 33. The transceiver 32 executes processes such as the conversion (IFFT process) from the signal into a time domain signal for each sub-carrier, a merging process of time domain signals, a CP (Cyclic Prefix) addition process, and the like.

The data plane unit 41 of the control unit 40 mainly performs a protocol process for a signal of a data plane between the base station eNB and the mobile station UE. Moreover, the scheduler control unit 411 performs scheduling, for example in units of resource blocks for each mobile station UE. The process of the scheduler 33 is performed based on results of the scheduling performed by the scheduler control unit 411.

The control plane unit 42 of the control unit 40 mainly performs a protocol process of a signal of a control plane between the base station eNB and the mobile station UE.

The backhaul control unit 421 performs a control to configure a backhaul between the base station eNB and the mobile relay station. The backhaul control unit 421 for example configures a backhaul between the base station eNB and the mobile relay station, configures a backhaul based on a notification of specifying a backhaul by the mobile relay station RN, issues a request to release a backhaul, and the like. Here, the control plane unit 42 successively manages timings of a handover and BCCH modification boundaries. In this embodiment, the backhaul control unit 421 configures a backhaul within a Measurement gap in the period (the above described first period) from the detection of a handover up to the next BCCH modification boundaries after the handover is detected.

The scheduler control unit 411 of the data plane unit 41 performs scheduling for each mobile station UE based on the backhaul configured by the backhaul control unit 421. The scheduler 33 maps a data signal addressed to each mobile station UE onto a radio frame format according to results of the scheduling performed by the scheduler control unit 411.

(1-3) Operations of the Mobile Relay Station RN

Figure 11:
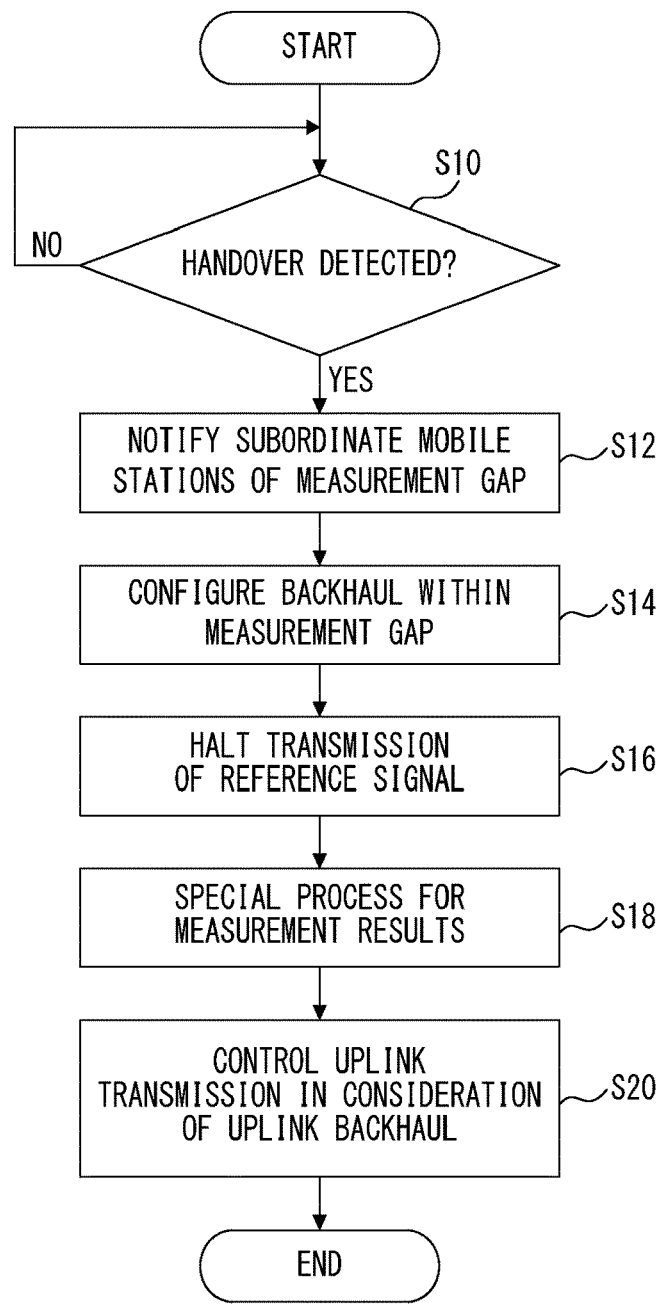
FIG. 11 is a flowchart illustrating operations of the relay station according to the first embodiment.

One example of operations, mainly associated with the backhaul configurations, of the mobile relay station RN that performs a handover is described next with reference to FIG. 11. FIG. 11 is a flowchart illustrating an example of the operations of the mobile relay station RN.

Initially, upon detection of a handover ("YES" in step S10), the mobile relay station RN notifies its mobile station UE of a Measurement gap (step S12), and the backhaul control unit 421 configures a backhaul within the Measurement gap (step S14). At this time, the control plane unit 42 performs a control to halt a transmission of a downlink reference signal to the mobile station UE (step S16). The reason is as follows. A data signal includes a reference signal, for example in a unicast subframe addressed to the mobile station UE, and this reference signal gets into the transceiver of the mobile relay station RN to/from the base station eNB, so that self-interference is caused. By halting the reference signal as described above, control signals (control signal for a random access and control information of an upper-level layer for establishing a call) for a handover, which are transmitted/received to/from a base station at a move destination, can be transmitted/received at any timing.

It is assumed that the mobile relay station RN will be mounted in a vehicle in most cases. At this time, a mobile station UE with which the mobile relay station RN is to communicate is limited to a mobile station UE within the vehicle, and a mobile station UE outside the vehicle may not be considered to be handed over by the mobile relay station RN. Accordingly, halting the reference signal addressed to the mobile station UE as described above allows a backhaul to be secured between the relay station and the base station in a duration during which the reference signal is being halted. Therefore, the halting of the reference signal is preferable in that a transmission/reception of a control signal needed for a procedure (such as a random access) performed at the time of a handover is enabled.

In the meantime, by configuring the above described Measurement gap, the mobile relay station RN halts the transmission of the reference signal upon detection of a handover. Therefore, signal levels of other cells can be satisfactorily measured in the mobile station UE under the mobile relay station RN. Such measurement results differ from those obtained when the transmission of the reference signal is assumed to not be halted, and can possibly be results on which an actual condition is not reflected. Accordingly, upon reception of a Measurement report based on a measurement made within the Measurement gap, in which a backhaul is configured, from the mobile station UE, the control plane unit 42 executes the following process. Namely, the control plane unit 42 executes a special process such as a process for excluding results of the measurement made within the duration of the Measurement gap from measurement results used as a basis to execute processes for the mobile station, a determination of whether or not to perform a handover of the mobile station, a decision of modulation and encoding scheme of the mobile station, and the like (step S18).

Additionally, the control plane unit 42 performs a control for an uplink transmission in consideration of the uplink backhaul configured in step S14 (step S20). Namely, the control plane unit 42 performs a control to not transmit an uplink transmission grant signal (UL grant transmitted with a PDCCH) to the mobile station UE 4 subframes (4 ms) before the uplink backhaul configured in step S14.

As described above, in the mobile communication system according to this embodiment, the mobile relay station RN configures a common communication restriction period for mobile stations UE under the mobile relay station RN in the period (first period) from detection of a handover until when a new backhaul is applied. In this embodiment, this common communication restriction period is implemented by the Measurement gap. In the Measurement gap, the mobile stations UE under the mobile relay station RN do not transmit/receive data. Therefore, a backhaul can be configured in an arbitrary duration within the Measurement gap.

(2) Second Embodiment (2-1) Backhaul Configuring Method According to this Embodiment In this embodiment as well, similarly to the first embodiment, the mobile relay station RN configures a common communication restriction period for a mobile station UE under the mobile relay station RN during the period (first period) from detection of a handover until when a new backhaul between a target base station (destination base station) and the mobile relay station RN is applied. In this embodiment, this common communication restriction period is implemented by a DRX (Discontinuous Reception) duration. This DRX duration is an intermittent reception period during which a radio signal does not need to be received in terms of LTE specification in order to reduce power consumption or the like of the mobile station UE.

In the DRX duration, the mobile station UE does not always need information of a PDCCH (Physical Downlink Control Channel), which is a downlink L1/L2 control signal addressed to a mobile station UE. Accordingly, the mobile relay station RN does not need to transmit the PDCCH during the DRX duration. Namely, the mobile relay station RN can halt a downlink data transmission addressed to the mobile station UE in the DRX duration. Therefore, a downlink backhaul can be configured in the DRX duration. At this time, it is preferable that the mobile relay station RN also halt a downlink reference signal due to a reason similar to that in the first embodiment.

Additionally, since there is a low possibility that an uplink data transmission from the mobile station UE to the mobile relay station RN will occur during the DRX duration, an uplink backhaul can in principle be arbitrarily configured in the DRX duration. When an uplink data transmission occurs in the DRX duration, an SR transmission (Scheduling Request) or an RA procedure (Random Access Procedure) can be performed. Accordingly, when the mobile relay station RN configures a common DRX duration for mobile stations under the mobile relay station RN, it is preferable that the mobile relay station RN performs a resource control for limiting the number of subframes with which the SR transmission can be made, and/or a resource control for limiting the number of PRACHs (Physical Random Access Channels) in order to restrict durations where the RA procedure can be executed.

Figure 12:
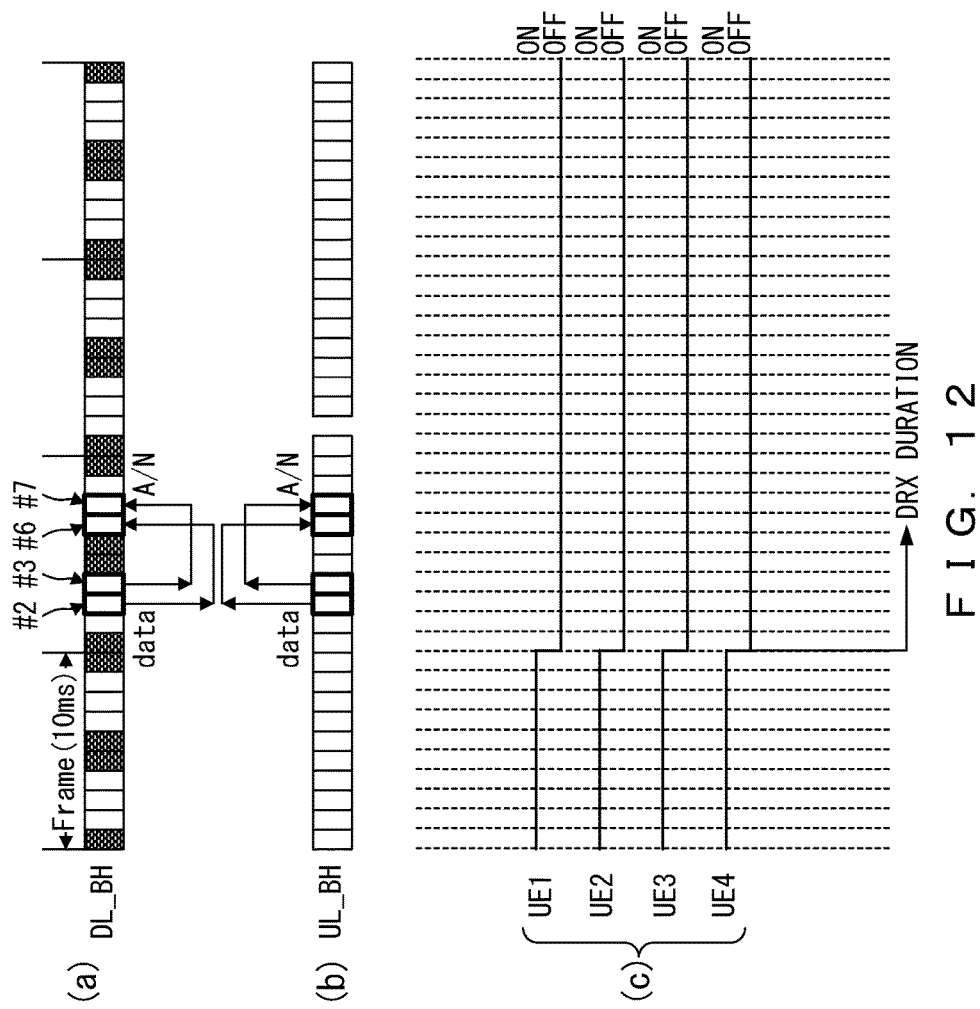
FIG. 12 is an explanatory view of a backhaul configuring method according to a second embodiment.

This embodiment is further described with reference to FIG. 12. FIG. 12 is an explanatory view of the backhaul configuring method according to this embodiment. In FIG. 12, (a) represents subframes configurable as a downlink backhaul, (b) represents subframes configurable as an uplink backhaul, and (c) represents a DRX duration (section of reception ON/OFF) configured for all mobile stations UE.

(a) and (b) of FIG. 12 are identical to (a) and (b) of FIG. 8. Here, the common DRX duration is configured for all mobile stations UE (such as UEs 1-4) as illustrated in 12(c). A mobile relay station RN according to this embodiment configures an arbitrary subframe within the DRX duration as a backhaul during the first period (the duration up to the start time of the next BCCH modification period) at the timing of detecting a handover and making an advance notification.

FIG. 12(c) illustrates the example where downlink and uplink backhauls are configured in the subframes #2, #3, #6 and #7. However, this is merely one example. The backhauls may be configured in any subframe within one frame as long as a common DRX duration is configured for all mobile stations UE and the backhauls are configured within this duration.

(2-2) Operations of the Mobile Relay Station RN

Figure 13:
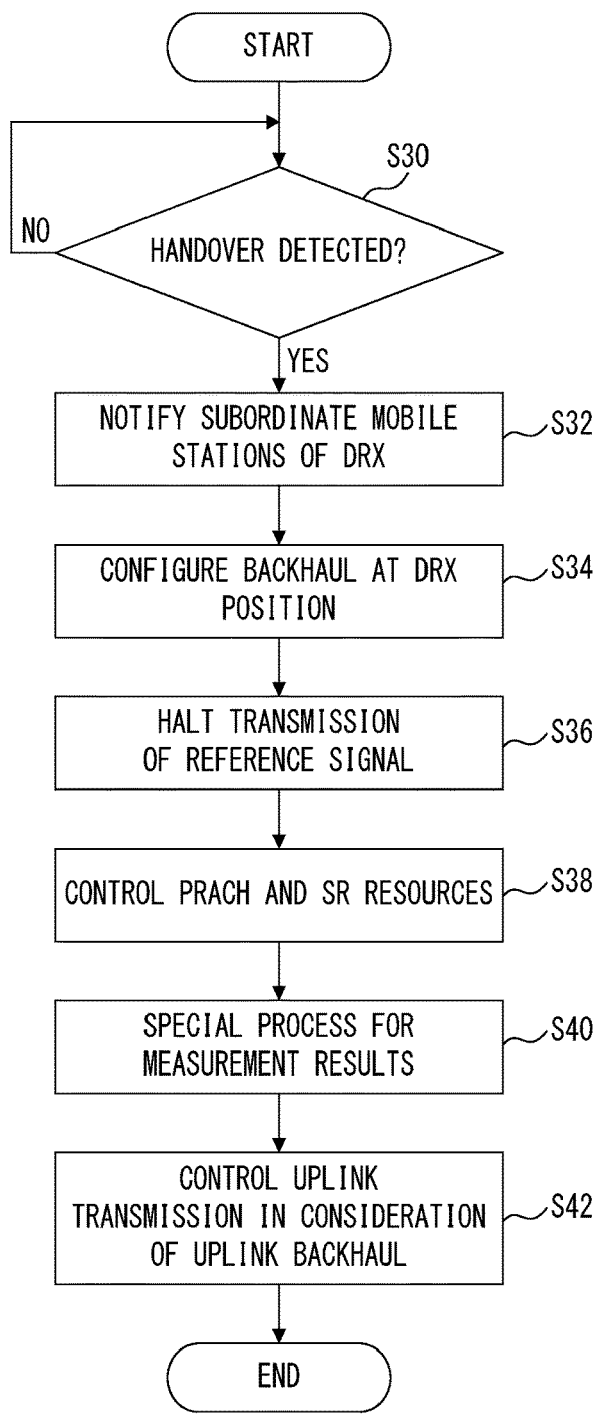
FIG. 13 is a flowchart illustrating an example of operations of a mobile relay station according to the second embodiment.

One example of operations, mainly associated with the backhaul configurations, of the mobile relay station RN that performs a handover is described next with reference to FIG. 13. FIG. 13 is a flowchart illustrating an example of the operations of the mobile relay station RN.

Upon detection of a handover ("YES" in step S30), the mobile relay station RN initially notifies a mobile stations UE under the mobile relay station RN of a DRX duration (step S32), and the backhaul control unit 421 configures a backhaul within the DRX duration (step S34). At this time, the control plane unit 42 performs a control to halt a transmission of a reference signal to the mobile stations UE (step S36). The reason for halting the transmission of the reference signal is similar to that in the first embodiment.

Next, the control plane unit 42 of the mobile relay station RN performs a resource control for limiting the number of subframes with which the SR transmission can be made, and/or a resource control for limiting the number of PRACHs in order to restrict durations where the RA procedure can be executed (step S38). As a result, the quantity of data transmissions that can occur during the DRX duration can be restricted, and a possibility that self-interference will occur in the mobile relay station RN can be reduced. Thereafter, similarly to the first embodiment, upon reception of a Measurement report based on a measurement made within the DRX duration, in which the backhaul is configured, from the mobile station UE, the control plane unit 42 executes a special process such as a process for excluding results of the measurement made within the DRX duration from measurement results used as a basis for executing processes for the mobile station, a determination of whether or not to perform a handover of the mobile station, a decision of modulation and encoding scheme of the mobile station, and the like (step S40).

Additionally, the control plane unit 42 performs a control for an uplink transmission in consideration of the uplink backhaul configured in step S34 (step S42). Namely, the control plane unit 42 performs a control to not transmit an uplink transmission grant signal (UL grant transmitted with a PDCCH) to the mobile station UE 4 subframes (4 ms) before the uplink backhaul configured in step S34.

(3) Third Embodiment (3-1) Backhaul Configuring Method According to this Embodiment A handover processing method, which includes a backhaul configuring method according to this embodiment, in a mobile communication system is described with reference to FIG. 14. FIG. 14 is a flowchart illustrating the preferable processing method from detection of a handover of the mobile relay station RN until when a new backhaul is configured between a target base station eNB (destination base station) and the mobile relay station RN in the mobile communication system.

With reference to FIG. 14, the mobile relay station RN initially reports a radio quality and the like obtained from a source base station eNB (Source eNB) and a target base station eNB (Target eNB) to the source base station eNB, with which the mobile relay station RN is currently communicating, in a format of Measurement Reports (step S50). Upon deciding the handover of the mobile relay station RN when receiving this report of received power values, the source base station eNB transmits a handover request message (Handover Request) to the target base station eNB (step S51). The target base station eNB transmits a handover request acknowledgment message (Handover Request Ack) to the source base station eNB in response to the handover request message (step S52). At this time, in this embodiment, the target base station eNB makes information (information for configuring a backhaul) about a backhaul (such as a position of an MBSFN subframe) configurable by the target base station included in the handover request acknowledgment message.

The source base station eNB transmits, to the mobile relay station RN, an HO command (RRC Connection Reconfiguration including MobilityControlInfo) including the information for configuring a backhaul by the target base station eNB (step S53). By this point in time at the latest, the mobile relay station RN has detected the handover.

Upon recognizing the backhaul configurable by the target base station eNB, the mobile relay station RN compares the recognized backhaul with a backhaul currently configured in the mobile relay station, and determines whether or not the backhaul currently configured in the mobile relay station can be maintained even after the handover. When the mobile relay station determines that the backhaul can not be maintained, the mobile relay station RN gives, to mobile stations UE under the mobile relay station RN, an advance notification of updating broadcast information by transmitting a Paging message or broadcast information including a Value Tag upon reception of the above HO command (step S54). Hereafter, the mobile relay station RN may configure a Measurement gap or a DRX duration so that the backhaul is covered as described earlier in the first and the second embodiments.

Thereafter, the mobile relay station RN performs a handover (HO) process between the target base station eNB and the mobile relay station at the timing of the next BCCH modification boundaries or before the next BCCH modification boundaries, and completes the handover (step S55). The mobile relay station RN internally manages timings of successive BCCH modification boundaries. The mobile relay station RN has obtained the information about the backhaul configured in the target base station eNB in step S53, and has given the advance notification to the mobile station UE under the mobile relay station RN in step S54. Therefore, the mobile relay station RN can configure a new backhaul at the moment when the handover is complete (step S56).

A basic procedure of the handover process is disclosed by the above described Document 4. The processing method according to this embodiment illustrated in FIG. 14 is different from the procedure disclosed by the Document 4 (Figure A.2-1: RN Mobility-Alt 1-) mainly in the following points.
(1) The source base station eNB obtains, from the target base station eNB, information about a backhaul of the target base station eNB.
(2) The mobile relay station RN obtains, from the source base station eNB, information about a backhaul of the target base station eNB.
(3) The mobile relay station RN gives an advance notification to mobile stations UE under the mobile relay station RN before a handover is complete.
(4) The mobile relay station RN completes the handover process with the target base station eNB at the timing of the next BCCH modification boundary or before the next BCCH modification boundary.

(3-2) Operations of the Mobile Relay Station RN

One example of operations, mainly associated with the backhaul configurations, of the mobile relay station RN that performs a handover is described next with reference to FIG. 15. FIG. 15 is a flowchart illustrating an example of the operations of the mobile relay station RN.

When it is determined that a backhaul currently configured in the mobile relay station cannot be maintained after detecting a handover ("YES" in step S60), the mobile relay station RN gives an advance notification of changing broadcast information to mobile stations UE under the mobile relay station RN (step S62). This advance notification corresponds to step S54 of FIG. 14. Next, the mobile relay station RN configures a backhaul within the Measurement gap or the DRX duration using the method described in the first or the second embodiment (step S64).

Upon completion of the handover to the target base station eNB (step S66), the backhaul configured in the target base station eNB is newly configured for the mobile relay station RN by the mobile relay station RN (step S68). The handover by the mobile relay station RN is complete at the timing of the next BCCH modification boundaries or before the next BCCH modification boundaries. Timings of BCCH modification boundaries are managed by the control plane unit 42.

Next, the control plane unit 42 of the mobile relay station RN performs a control for an uplink transmission in consideration of the uplink backhaul configured in step S68 (step S70). Namely, the control plane unit 42 performs a control to not transmit an uplink transmission grant signal (UL grant transmitted with a PDCCH) to the mobile station UE 4 subframes (4 ms) before the uplink backhaul configured in step S68.

As described above, in the mobile communication system according to this embodiment, the mobile relay station RN obtains the HO command (RRC Connection Reconfiguration including MobilityControlInfo) including information about the backhaul configured in the target base station eNB during the handover process of the mobile relay station. The advance notification is given to the mobile station UE based on the information for configuring a backhaul, reported via the HO command, and the handover is completed at the timing of the next BCCH modification boundaries or before the next BCCH modification boundaries. Accordingly, the mobile relay station RN can configure the backhaul, which is configured in the target base station eNB, for the mobile relay station immediately after the timing at which the timing of the BCCH modification boundary is reached.

(4) Fourth Embodiment

With the backhaul configuring method according to the third embodiment, the mobile relay station RN does not configure a backhaul until the next BCCH modification boundaries is reached after obtaining information about the backhaul configurable by the target base station eNB. In contrast, with a backhaul configuring method according to this embodiment, the mobile relay station RN configures a newly obtained backhaul before the HO command is transmitted in addition to a backhaul between the source base station eNB and the mobile relay station, after obtaining information about the backhaul configurable by the target base station eNB.

Figure 16:
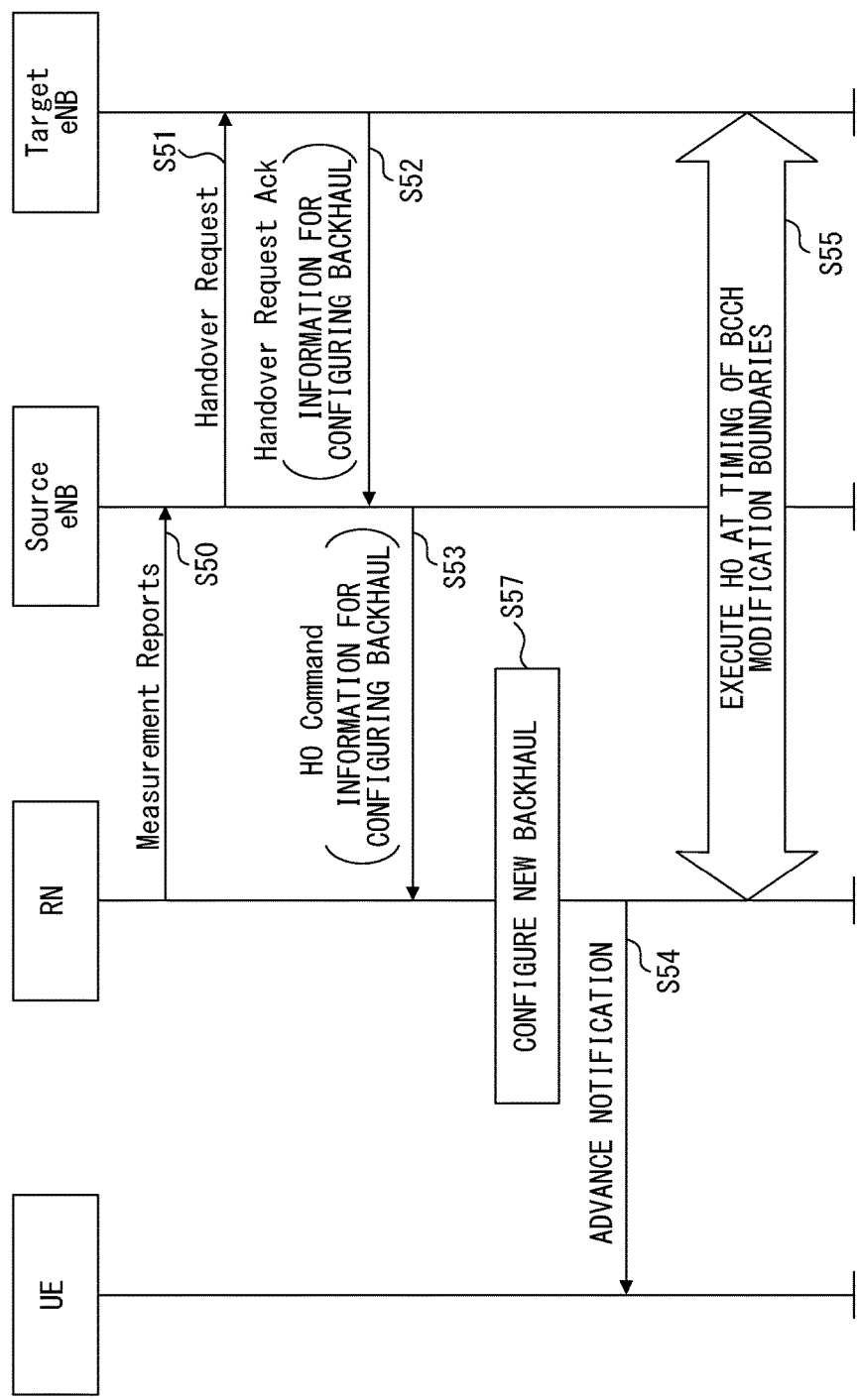
FIG. 16 is a flowchart illustrating a processing method of a handover of a mobile relay station in a mobile communication system according to a fourth embodiment.

FIG. 16 illustrates the backhaul configuring method according to this embodiment. The sequence illustrated in FIG. 16 is different from FIG. 14 in that step S57 is replaced with step S56. Note that step S57 may be executed before step S53. Upon recognizing a backhaul configurable by the target base station eNB, the mobile relay station RN compares the recognized backhaul with a backhaul currently configured in the mobile relay station, and executes the following process in step S57. Namely, the mobile relay station RN initially determines whether or not the backhaul currently configured in the mobile relay station will be able to be maintained even after a handover. When it is determined that the backhaul is unable to be maintained, the mobile relay station RN configures any (second duration) of the backhauls configurable by the target base station eNB in addition to the backhaul (the first duration) configured between the source base station eNB and the mobile relay station. When a backhaul is newly configured, a corresponding subframe needs to be configured as an MBSFN subframe between the mobile relay station RN and a mobile station under the mobile relay station RN. Accordingly, the mobile relay station RN gives an advance notification of updating broadcast information by transmitting a Paging message or broadcast information including a Value Tag as described above, and configures the backhaul at a time point when BCCH modification boundaries are reached and the MBSFN subframe is actually configured. By so doing, the mobile relay station can transmit/receive control signals (random access and the like) for a handover to/from the target base station eNB even in the newly added backhaul.

Figure 1:
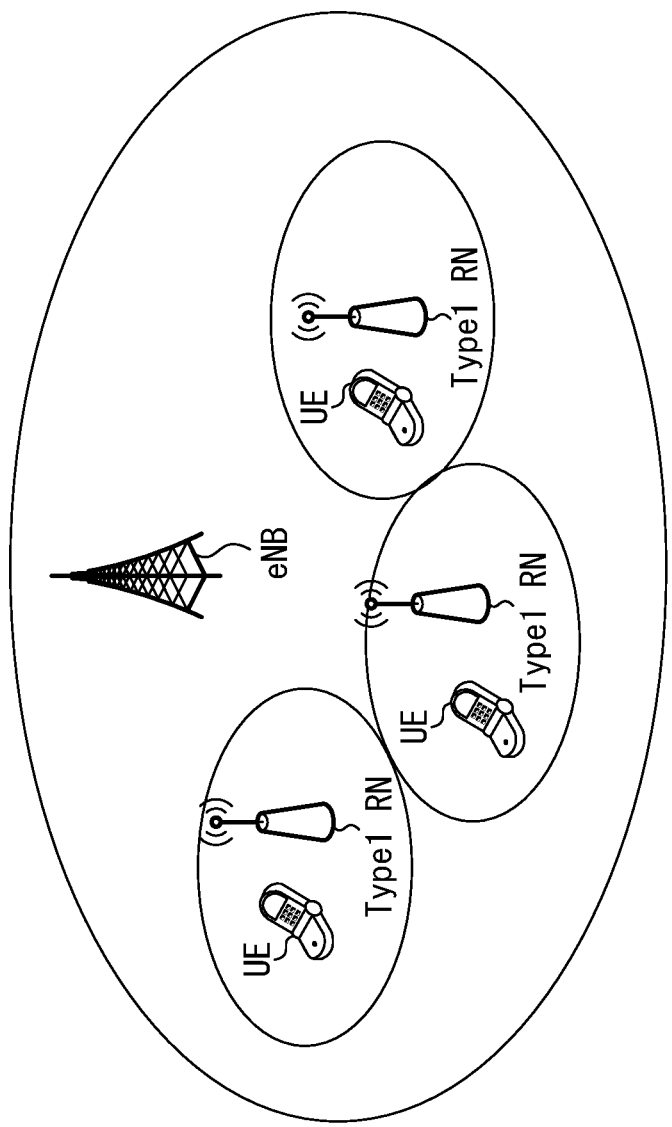
FIG. 1 illustrates a configuration of a mobile communication system including a relay station for supporting a communication between a base station and a mobile station.
Figure 2:
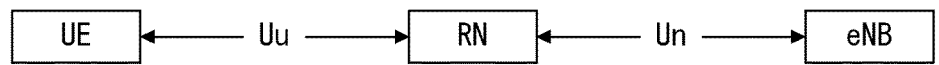
FIG. 2 illustrates a configuration of links among a base station, a relay station, and a mobile station.
Figure 3:
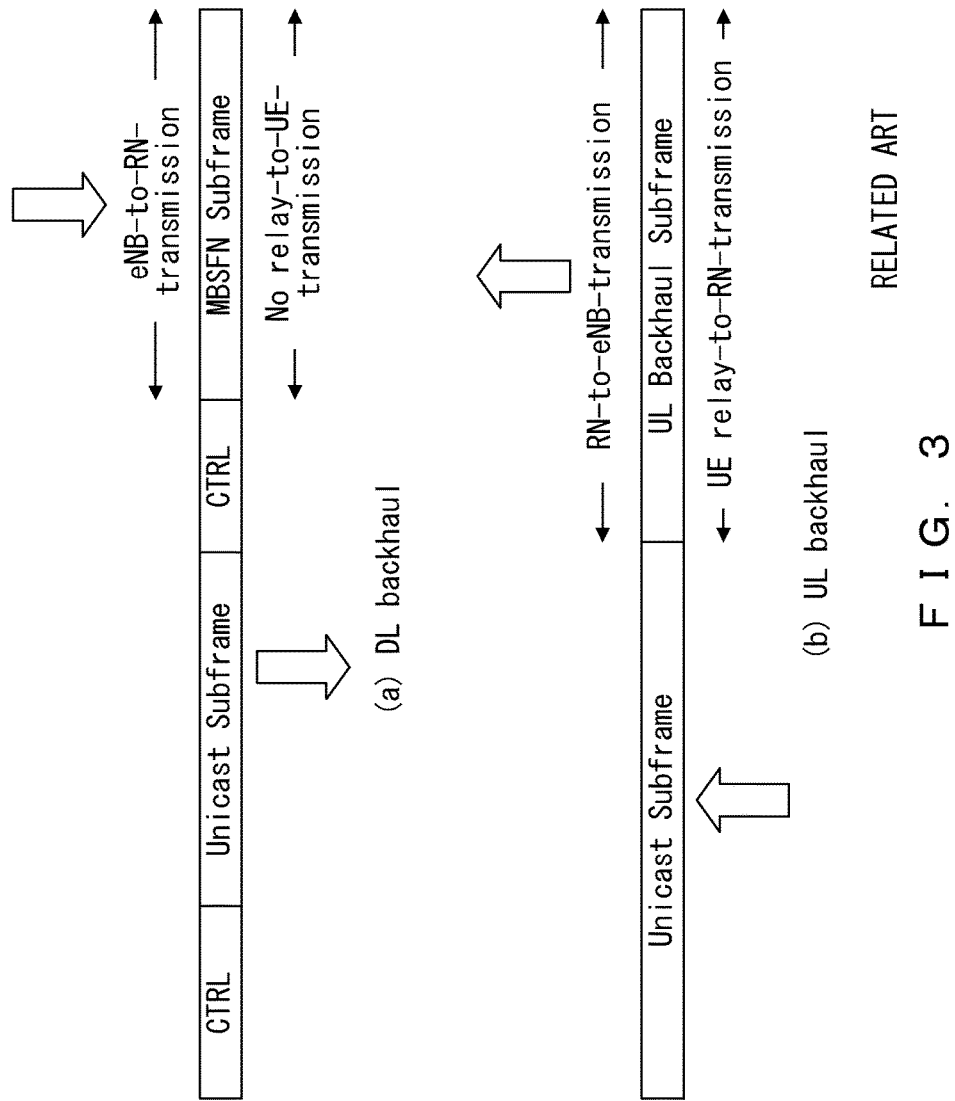
FIG. 3 illustrates a known design policy of configuring a backhaul.
Figure 4:
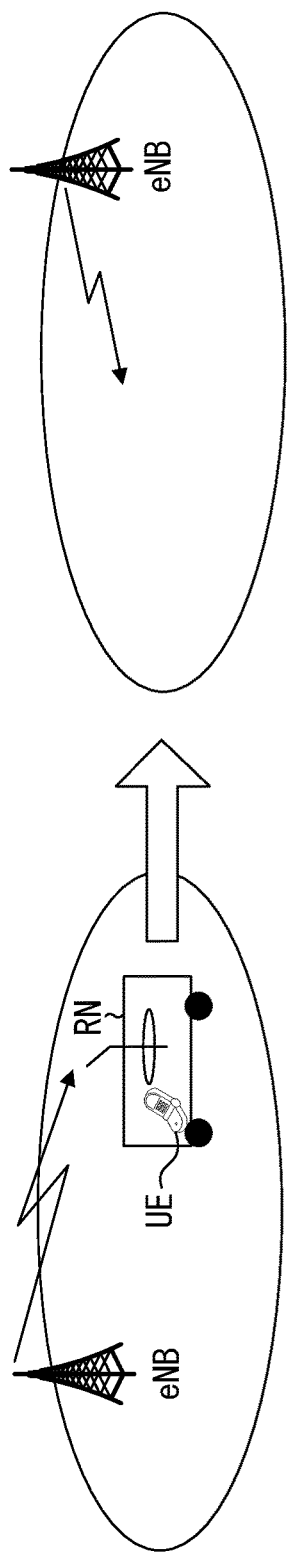
FIG. 4 schematically illustrates a situation of a handover of a mobile relay station.
Figure 5:
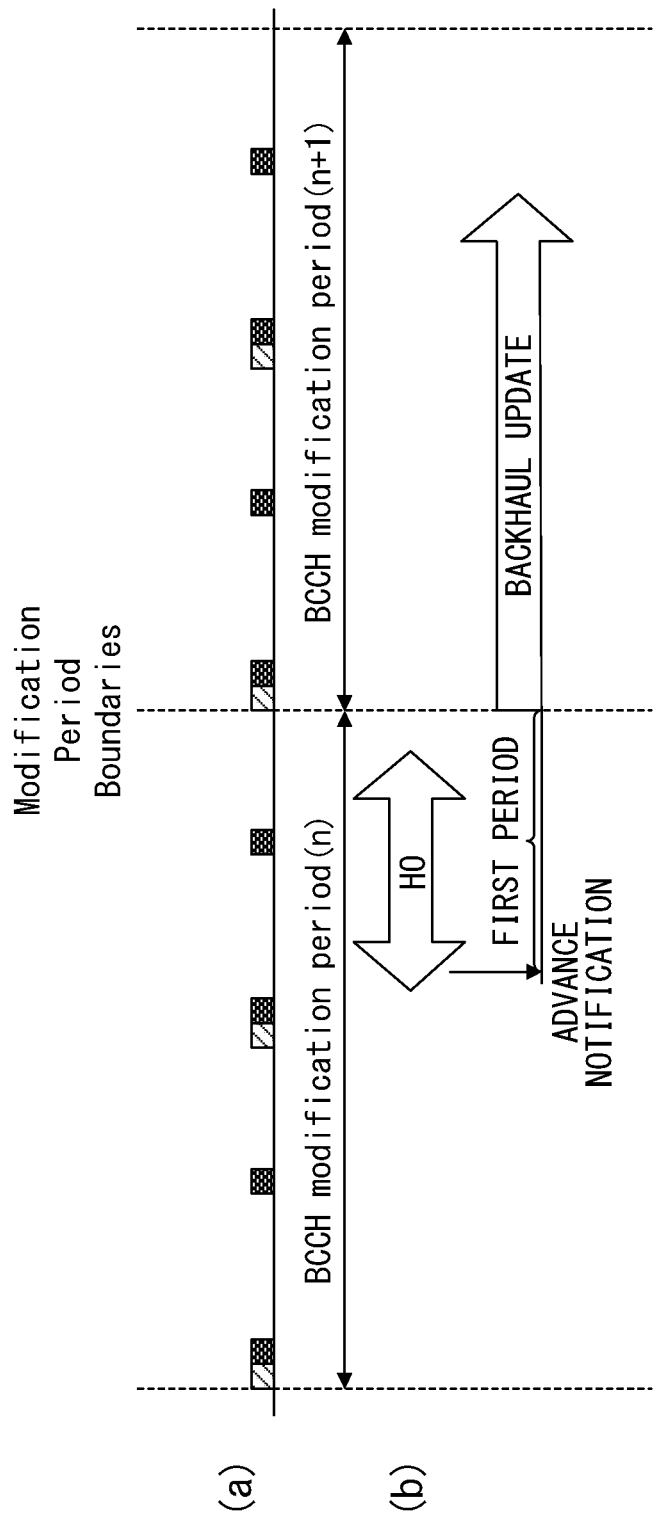
FIG. 5 is an explanatory view of a relationship between an update of broadcast information and that of a backhaul.
Figure 6:
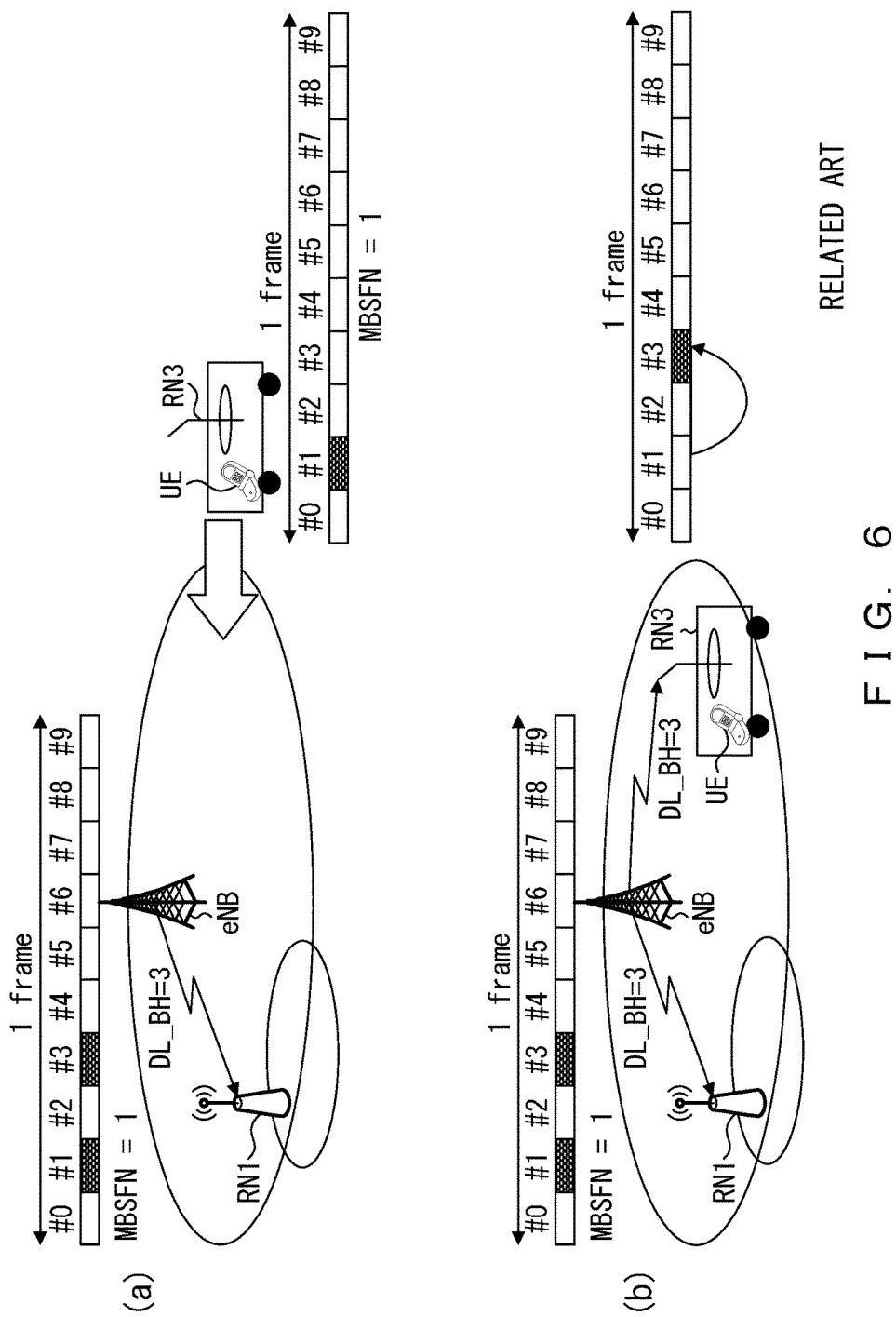
FIG. 6 is an explanatory view of a situation in which it is difficult to continuously configure a backhaul used before a handover after the handover is performed in a conventional mobile communication system.
Figure 7:
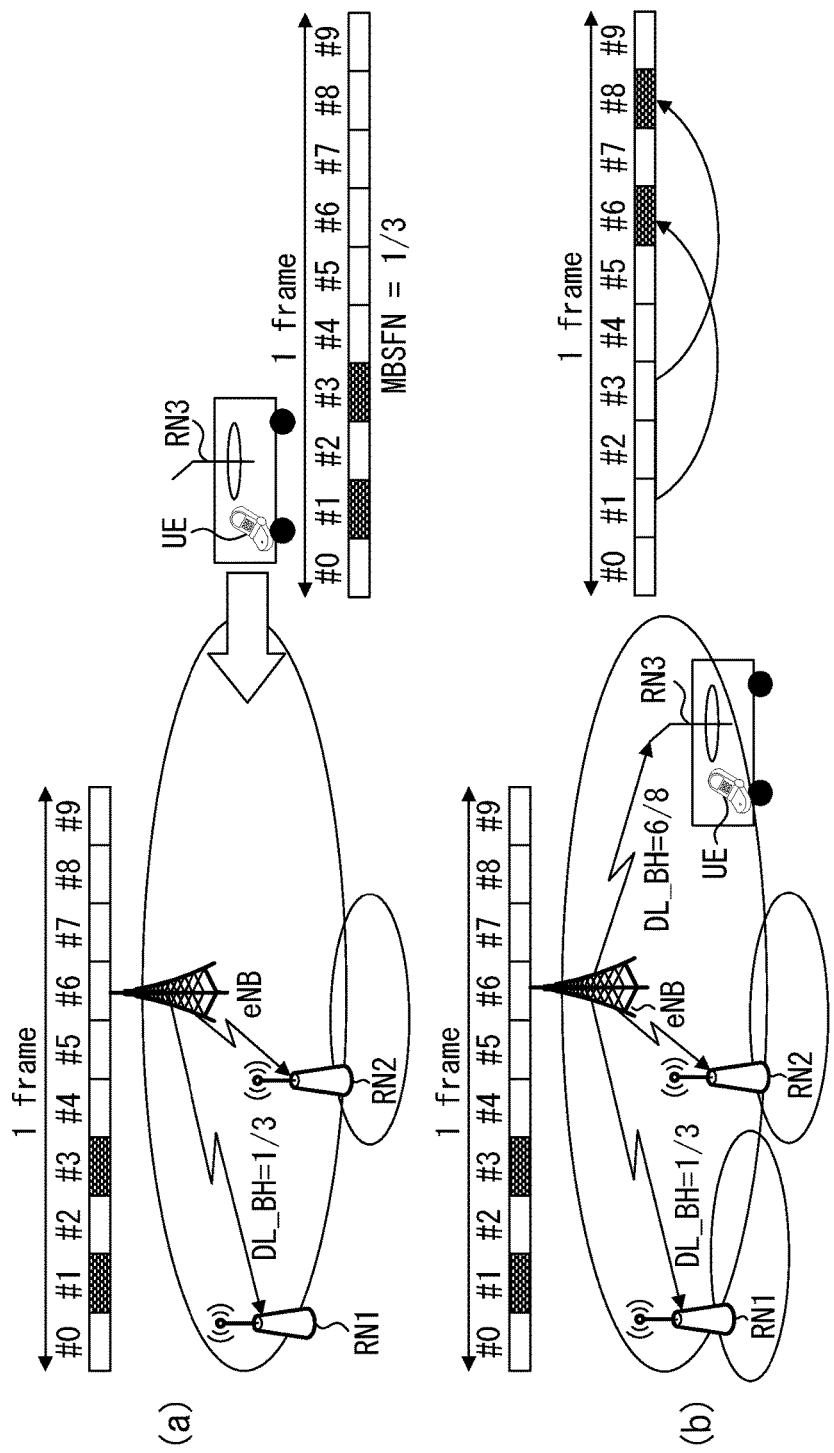
FIG. 7 is an explanatory view of a situation in which it is difficult to continuously configure a backhaul used before a handover after the handover is performed in the conventional mobile communication system.
Figure 17:
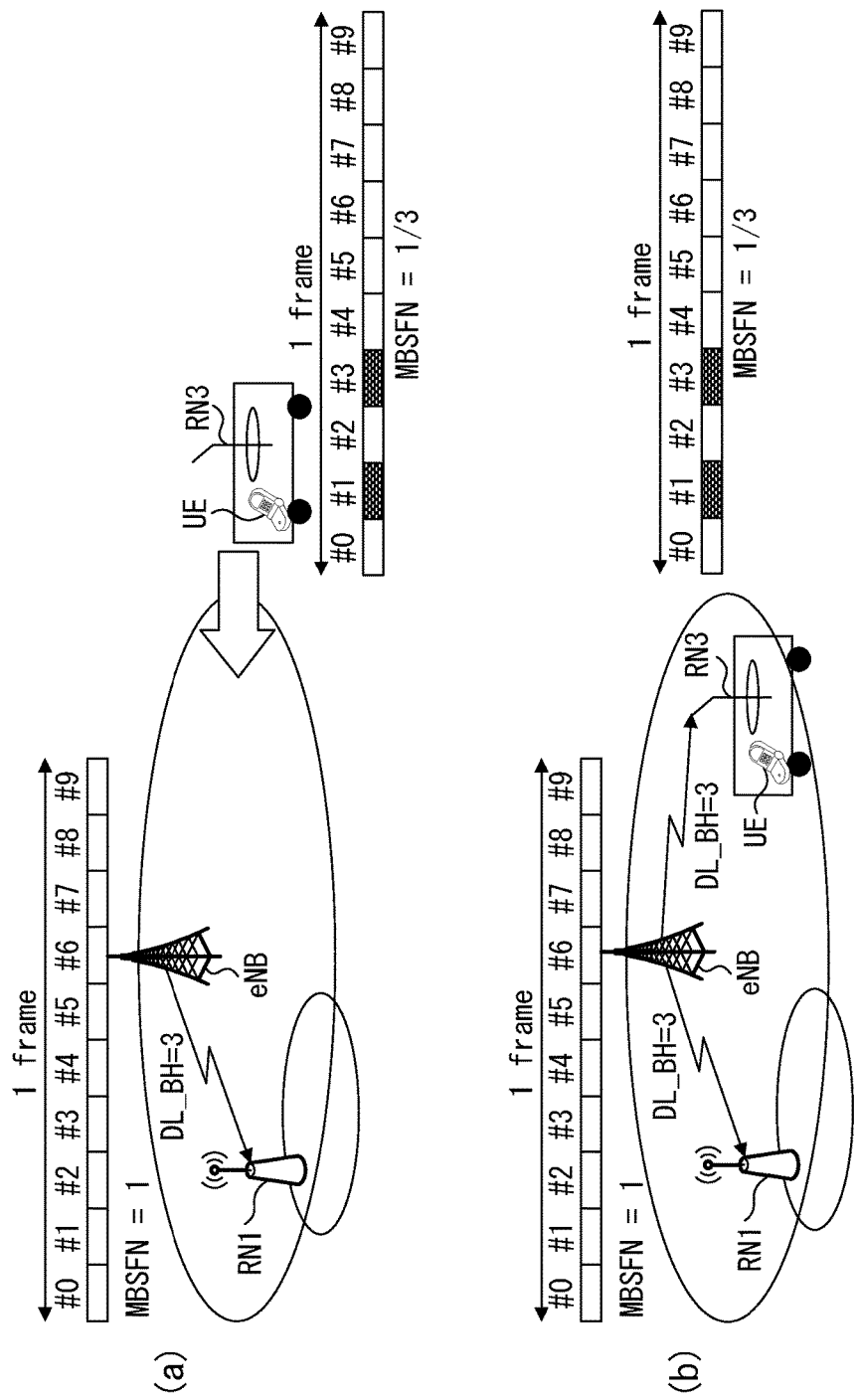
FIG. 17 schematically illustrates a backhaul configuring method according to the fourth embodiment.

An example of the backhaul configuring method according to this embodiment is described with reference to FIGS. 17 and 18. FIGS. 17 and 18 schematically illustrate the backhaul configuring method according to this embodiment, and respectively correspond to the situations illustrated in FIGS. 6 and 7. In FIGS. 17 and 18, (a) schematically illustrates a state before a handover is complete, whereas (b) schematically illustrates a state after the handover is complete.

In the example illustrated in FIG. 17(a), the mobile relay station RN3 configures the subframe #1 as a downlink backhaul (MBSFN subframe) between the source base station eNB and the mobile relay station RN3. The mobile relay station RN3 obtains information with respect to backhauls configurable by the target base station eNB from the target base station eNB, and additionally configures the subframe #3 as a backhaul from among the configurable backhauls. As a result, the subframes #1 and #3 are being configured as downlink backhauls (MBSFN=1/3) before the handover is complete. Accordingly, as illustrated in FIG. 17(b), the mobile relay station RN3 can continue the communication without changing the configurations of the backhaul after the handover is complete and without causing self-interference to occur.

In the example illustrated in FIG. 18(a), the mobile relay station RN3 configures the subframes #1 and #3 (MBSFN=1/3) from among 10 subframes #0 to #9 within one frame as downlink backhauls (MBSFN subframes) between the source base station eNB and the mobile relay station RN3. The mobile relay station RN3 obtains information with respect to downlink backhauls configurable by the target base station eNB from the target base station eNB, and additionally configures the subframes #6 and #8 from among the configurable downlink backhauls. As a result, the subframes #1, #3, #6 and #8 are being configured as downlink backhauls (MBSFN=1/3, 6/8) before the handover is complete. Accordingly, as illustrated in FIG. 18(b), the mobile relay station RN3 can continue the communication without changing the configurations of the backhaul after the handover is complete, and without causing self-interference to occur.

(5) Fifth Embodiment

In the third and the fourth embodiments, for example as indicated by step S52 of FIG. 14, backhauls configurable by the target base station eNB are reported from the target base station eNB to the source base station eNB with the handover request acknowledgment message (Handover Request Ack). However, the notification method is not limited to this one. Information about a backhaul configured in each base station eNB may be exchanged between adjacent base stations eNBs, for example periodically.

Figure 19A:
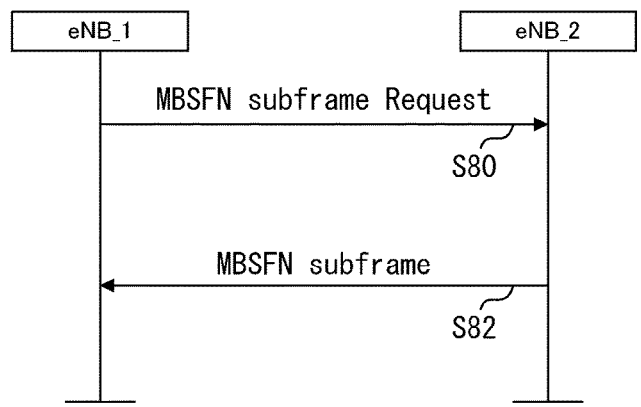
FIG. 19A is a flowchart illustrating a case where information about a duration of an MBSFN subframe is exchanged between adjacent base stations in a mobile communication system according to a fifth embodiment.
Figure 19B:
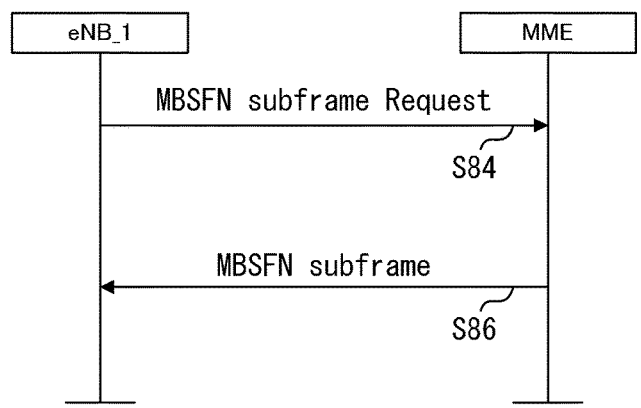
FIG. 19B is a flowchart illustrating a case where information about a duration of an MBSFN subframe is exchanged between adjacent base stations in a mobile communication system according to the fifth embodiment.
Figure 19C:
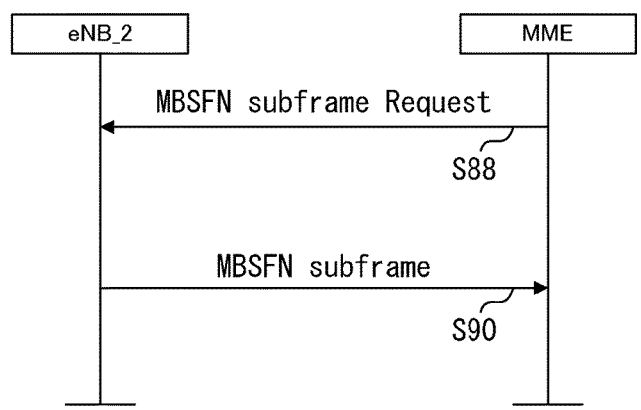
FIG. 19C is a flowchart illustrating the case where the information about the duration of the MBSFN subframe is exchanged between the adjacent base stations in the mobile communication system according to the fifth embodiment.

FIGS. 19A to 19C are flowcharts when information about a duration of an MBSFN subframe is exchanged between adjacent base stations eNB_1 and eNB_2.

In FIG. 19A, the information is exchanged directly with an X2 interface between the adjacent base stations eNB_1 and eNB_2. Namely, the base station eNB_1 transmits an MBSFN subframe information request message (MBSFN subframe Request) to the base station eNB_2 (step S80). This message may include the information about the duration of the MBSFN subframe configured in the base station eNB_1. The base station eNB_2 reports the information about a duration of an MBSFN subframe configured in the base station eNB_2 in response to this message (step S82).

In FIGS. 19B and 19C, an MME (Mobility Management Entity) manages the information about the duration of MBSFN subframes of the adjacent base stations eNB_1 and eNB_2. The information is indirectly exchanged via the MME (Mobility Management Entity) between the adjacent base stations eNB_1 and eNB_2. A communication between each of the base stations and the MME is given with an S1 interface.

Namely, in FIG. 19B, the base station eNB_1 transmits the MBSFN subframe information request message (MBSFN subframe Request) to the MME (step S84). This message may include the information about the duration of the MBSFN subframe configured in the base station eNB_1. In response to this message, the MME reports the recorded information about the duration of the MBSFN subframe of the base station eNB_2 (step S86).

Additionally, the MME transmits an MBSFN subframe information request message (MBSFN subframe Request) to the base station eNB_2 (step S88). This message may include the information, recorded by the MME, about the duration of the MBSFN subframe of the base station eNB_1. In response to this message, the base station eNB_2 notifies the MME of the information about the duration of the MBSFN subframe of the base station eNB_2 (step S90).

The examples illustrated in FIGS. 19A to 19C represent the cases where the information about the duration of the MBSFN subframe is exchanged between the adjacent base stations eNB_1 and eNB_2. However, information about a configurable backhaul may be exchanged between adjacent base stations.

Alternatively, when the information is exchanged via the MME as illustrated in FIGS. 19B and 19C, a target of a communication with the MME is not limited to an adjacent base station and may be an adjacent relay station. Namely, the information can also be exchanged between an adjacent base station and an adjacent relay station.

(6) Sixth Embodiment

(6-1) Backhaul Configuring Method According to this Embodiment

While a handover is being processed, various items of control information are transmitted/received among the mobile relay station RN, the source base station eNB, and the target base station eNB. Transmissions/receptions of such control information correspond, for example, to "7. RRC Conn. Reconf incl MobilityControlInformation", "9. Synchronization", "10. UL allocation+TA for UE", "11. RRC Conn Reconf Complete" in the procedure disclosed by Document 4 (Figure A.2-1: RN Mobility-Alt1-). Although the transmissions/receptions of the control information are made in a backhaul, it may take long time to transmit/receive the control information depending on a configured backhaul. Accordingly, a delay time of the handover process sometimes increases.

Accordingly, with the backhaul configuring method according to this embodiment, a backhaul is configured in an arbitrary duration within a frame during the first period from a time when the mobile relay station detects a handover and makes an advance notification up to the start time (BCCH modification boundaries) of the next BCCH modification period. During the first period, the mobile relay station RN may continuously use an already configured backhaul, or may configure a backhaul from among backhauls that are obtained while the handover procedure is being executed and are configurable by the target base station eNB. To arbitrarily configure a backhaul in this way, the mobile relay station RN halts a transmission of a downlink signal (reference signal or the like) addressed to a mobile station UE, and controls the mobile station UE to not transmit uplink signals (data signal, retransmission signal, SRS, PRACH and the like) during the first period.

Figure 20:
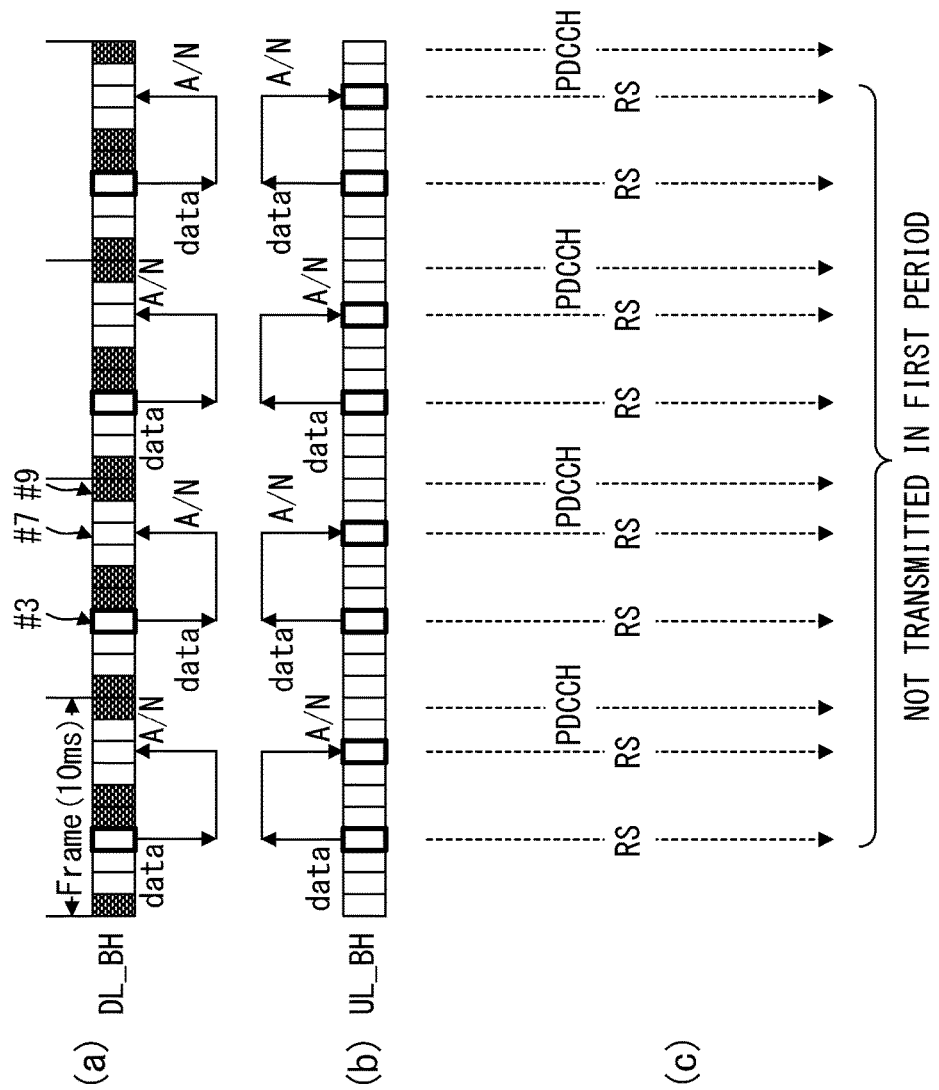
FIG. 20 schematically illustrates a backhaul configuring method according to a sixth embodiment.

This embodiment is further described with reference to FIG. 20. FIG. 20 is an explanatory view of the backhaul configuring method according to this embodiment. In FIG. 20, (a) represents a downlink backhaul configured in the first period, (b) represents an uplink backhaul configured in the first period, and (c) represents signals that are not transmitted in particular subframes. FIG. 20 illustrates an example where the backhauls are configured according to the situation illustrated in FIG. 6. Namely, the case where the mobile relay station RN configures the subframe #3 as a backhaul in the first period from among downlink backhauls configurable by the target base station eNB is assumed. At this time, the subframes #3 and #7 are being configured as the uplink backhaul.

A data transmission (data) is performed from the base station eNB to the mobile relay station RN in the subframe #3 (downlink backhaul). However, since the mobile relay station RN does not transmit the reference signal (RS) addressed to the mobile station UE in the subframe #3 in the first period, self-interference in the mobile relay station RN does not occur.

Additionally, a data transmission (data) is performed from the mobile relay station RN to the base station eNB in a subframe #3 (uplink backhaul), and an ACK/NACK signal (A/N) is received from the base station eNB after 4 subframes (4 ms), namely, in the subframe #7. Since the mobile relay station RN does not transmit the reference signal (RS) addressed to the mobile station UE in the subframe #7 in the first period, self-interference in the mobile relay station RN does not occur.

Furthermore, the mobile relay station RN does not transmit a PDCCH, namely, an uplink transmission grant signal (UL grant) to the mobile station UE in the subframe #9. As a result, the mobile station UE does not transmit a signal to the mobile relay station RN 4 ms after the subframe #9, namely, in the subframe #3 in the uplink backhaul. As described above, the mobile relay station RN performs, for the uplink backhaul, a control to not transmit a PDCCH in the subframe being 4 ms before the configured uplink backhaul.

It is assumed that in most cases the mobile relay station RN will be mounted in a vehicle. At this time, a mobile station UE with which the mobile relay station RN is to communicate is limited to a mobile station within the vehicle, and a mobile station UE outside the vehicle may not be considered to be handed over by the mobile relay station RN. Accordingly, halting the reference signal addressed to the mobile station UE as described above allows a backhaul between the relay station and the base station to be secured in a duration during which the reference signal is being halted. Therefore, the halting of the reference signal is preferable in that a transmission/reception of a control signal needed for a procedure (such as a random access) executed at the time of a handover is enabled.

(6-2) Operations of the Mobile Relay Station RN

Figure 21:
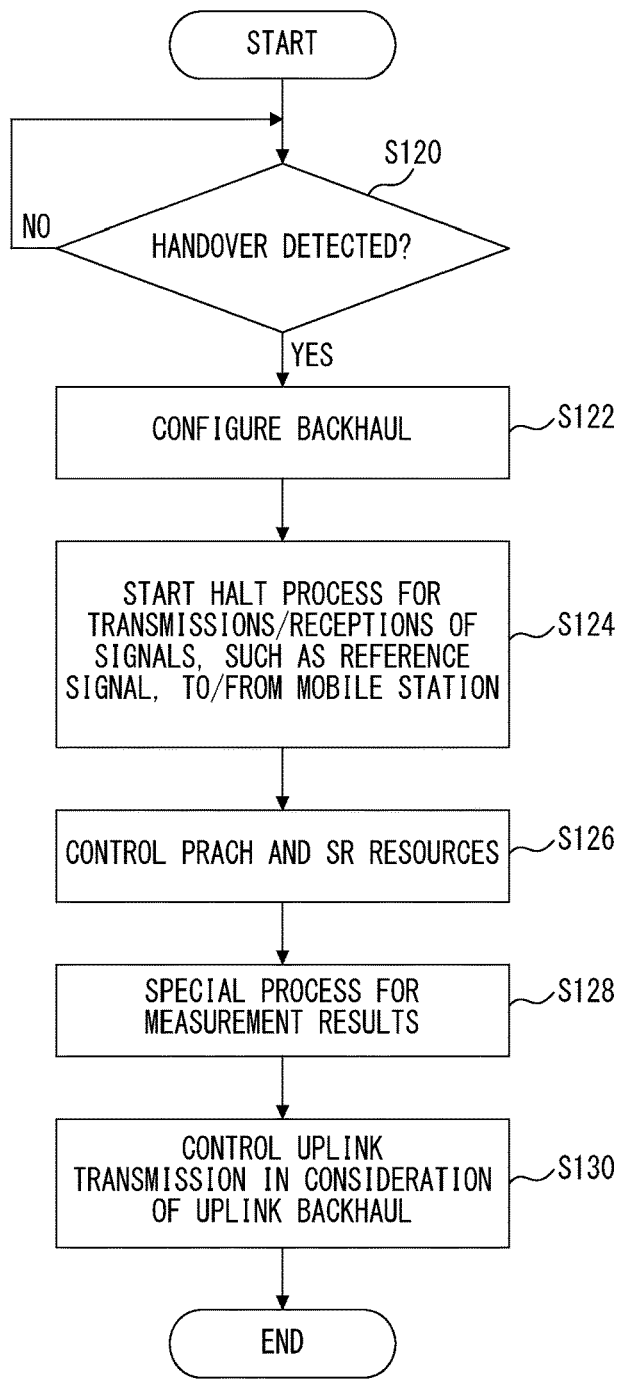
FIG. 21 is a flowchart illustrating an example of operations of a mobile relay station according to the sixth embodiment.

One example of operations, mainly associated with the backhaul configuration, of the mobile relay station RN that performs a handover is described with reference to FIG. 21. FIG. 21 is a flowchart illustrating an example of the operations of the mobile relay station RN.

When the mobile relay station RN determines that it is unable to maintain a backhaul currently configured in the mobile relay station after detecting a handover ("YES" in step S120), the backhaul control unit 421 of the mobile relay station RN configures a backhaul at an arbitrary position (step S122).

Hereafter, the mobile relay station RN halts a transmission of a downlink signal addressed to a mobile station UE, and controls the mobile station UE to not transmit an uplink signal. Initially, the control plane unit 42 of the mobile relay station RN starts a halt process of transmissions/receptions of signals, such as a reference signal and the like, between the mobile station UE and the mobile relay station (step S124). The control plane unit 42 also performs a resource control for limiting the number of subframes with which an SR transmission can be made, and/or a resource control for limiting the number of PRACHs in order to restrict the durations in which the RA procedure can be executed (step S126). Moreover, the mobile relay station RN halts the transmission of a downlink reference signal addressed to the mobile station UE. Therefore, similarly to the first embodiment, upon reception of a Measurement report, the control plane unit 42 executes a special process such as a process for excluding results of a measurement in the Measurement report from measurement results used as a basis of executing processes for the mobile station, a determination of whether or not to perform a handover of the mobile station, a decision of modulation and encoding schemes of the mobile station, and the like (step S128)

Next, the control plane unit 42 of the mobile relay station RN controls an uplink transmission in consideration of the uplink backhaul configured in step S122 (step S130). Namely, the control plane unit 42 performs a control to not transmit an uplink transmission grant signal (UL grant with a PDCCH) to the mobile station UE 4 subframes (4 ms) before the uplink backhaul configured in step S122.

The embodiments according to the present invention have been described in detail. However, the communication duration configuring method, the relay station and the mobile communication system according to the present invention are not limited to the above described embodiments, and can be improved and modified within a scope that does not depart from the gist of the present invention as a matter of course.

According to the disclosed communication duration configuring method, relay station, and mobile communication system, a communication duration can be suitably configured in a period from detection of a handover until an application of a new communication duration between a target base station (destination base station) and a relay station when a handover of the relay station that relays a wireless communication between a base station and a mobile station is performed. As a result, self-interference of the relay station in the above period can be avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication duration configuring method in a mobile communication system including a mobile relay station for relaying a wireless communication between a base station and a mobile station, the method comprising:
configuring at least one of communication durations from a downlink communication duration where the relay station receives a transmission signal from the base station while restricting a transmission of a signal from the relay station to the mobile station and an uplink communication duration where the relay station transmits a transmission signal to the base station while restricting a transmission of a signal from the mobile station to the relay station;
obtaining information for configuring the communication duration between the relay station and a handover base station from the handover base station at a time of a handover of the relay station, and configuring the communication duration by using the information;
giving a notification of changing broadcast information including the information for configuring the communication duration from the relay station to each mobile station when the communication duration configured between the relay station and a source base station is changed based on the information; and
configuring, as a second communication duration, any duration configurable as the communication duration between the relay station and the handover base station, which is identified based on the information for configuring the communication duration, in addition to a first communication duration configured between the relay station and the handover base station during a first period until the broadcast information including the information for configuring the communication duration is applied, after obtaining the information for configuring the communication duration, wherein
a period which is restricted the transmission of the signal from the mobile station to the relay station is set for all mobile stations belonging to the relay station, so that an identical period is set for all mobile stations belonging to the relay station.

2. The communication duration configuring method according to claim 1, the method further comprising
configuring the communication duration between the relay station and the handover base station at any duration configurable as the communication duration between the relay station and the handover base station and, which is identified based on the information for configuring the communication duration.

3. The communication duration configuring method according to claim 1, the method further comprising
completing the handover of the relay station at a timing when the broadcast information is applied.

4. A mobile relay station for relaying a wireless communication between a base station and a mobile station, the mobile relay station comprising:
a first transceiver configured to transmit/receive data to/from the base station;
a second transceiver configured to transmit/receive data to/from the mobile station; and
a control unit that configures at least one of communication durations from a downlink communication duration where the relay station receives a transmission signal from the base station while restricting a transmission of a signal from the relay station to the mobile station and an uplink communication duration where the relay station transmits a transmission signal to the base station while restricting a transmission of a signal from the mobile station to the relay station, wherein
the control unit obtains information for configuring the communication duration between the relay station and a handover base station from the handover base station at a time of a handover of the relay station, and configures the communication duration by using the information, wherein
a period which is restricted the transmission of the signal from the mobile station to the relay station is set for all mobile stations belonging to the relay station, so that an identical period is set for all mobile stations belonging to the relay station,
a notification of changing broadcast information including the information for configuring the communication duration is given to each mobile station connected to the relay station when the communication duration configured between the relay station and a source base station is changed based on the information, and
the control unit configures, as a second communication duration, any duration configurable as the communication duration between the relay station and the handover base station, which is identified based on the information for configuring the communication duration, in addition to a first communication duration configured between the relay station and the source base station during a first period until the broadcast information including the information for configuring the communication duration is applied, after obtaining the information for configuring the communication duration.

5. The relay station according to claim 4, wherein
the control unit configures the communication duration between the relay station and the handover base station at any duration configurable as the communication duration between the relay station and the handover base station, which is identified based on the information for configuring the communication duration.

6. The relay station according to claim 4 wherein a handover is complete at a timing when the broadcast information is applied.

7. A mobile communication system including a base station, a mobile station, and a mobile relay station for relaying a wireless communication between the base station and the mobile station, wherein
- the relay station includes a control unit that configures at least one of communication durations from a downlink communication duration where the relay station receives a transmission signal from the base station while restricting a transmission of a signal from the relay station to the mobile station and an uplink communication duration where the relay station transmits a transmission signal to the base station while restricting a transmission of a signal from the mobile station to the relay station,
- the control unit is configured to obtain information for configuring the communication duration between the relay station and a handover base station from the handover base station at a time of a handover of the relay station, and configures the communication duration by using the information,
- the base station includes a transceiver configured to transmit/receive a signal to/from the relay station based on the communication duration,
- the mobile station includes a transceiver configured to transmit/receive a signal to/from the relay station based on the communication duration, wherein
- a period which is restricted the transmission of the signal from the mobile station to the relay station is set for all mobile stations belonging to the relay station, so that an identical period is set for all mobile stations belonging to the relay station, wherein the relay station is further
- giving a notification of changing broadcast information including the information for configuring the communication duration from the relay station to each mobile station when the communication duration configured between the relay station and a source base station is changed based on the information; and
- configuring, as a second communication duration, any duration configurable as the communication duration between the relay station and the handover base station, which is identified based on the information for configuring the communication duration, in addition to a first communication duration configured between the relay station and the handover base station during a first period until the broadcast information including the information for configuring the communication duration is applied, after obtaining the information for configuring the communication duration.

* * * * *